United States Patent
Smith et al.

(10) Patent No.: US 10,787,212 B2
(45) Date of Patent: Sep. 29, 2020

(54) CONTROL SYSTEM FOR LOAD TRANSPORTATION DEVICE

(71) Applicant: Entro Industries, Inc., Hillsboro, OR (US)

(72) Inventors: Shawn Smith, Hillsboro, OR (US); Harlan Smith, Hillsboro, OR (US); Brian Unger, Hillsboro, OR (US)

( * ) Notice: Subject to any disclaimer, the term of this patent is extended or adjusted under 35 U.S.C. 154(b) by 1120 days.

(21) Appl. No.: 14/997,174

(22) Filed: Jan. 15, 2016

(65) Prior Publication Data

US 2016/0194041 A1  Jul. 7, 2016

Related U.S. Application Data

(63) Continuation of application No. 13/711,193, filed on Dec. 11, 2012, now Pat. No. 8,573,334, and a continuation of application No. 13/711,269, filed on Dec. 11, 2012, now Pat. No. 8,561,733, and a continuation of application No. 13/711,315, filed on Dec. 11, 2012, now Pat. No. 8,490,724.

(51) Int. Cl.
*B62D 57/02* (2006.01)
*B62D 57/032* (2006.01)
*E21B 15/00* (2006.01)

(52) U.S. Cl.
CPC ........... *B62D 57/02* (2013.01); *B62D 57/032* (2013.01); *E21B 15/003* (2013.01)

(58) Field of Classification Search
CPC ....... B62D 57/00; B62D 57/02; B62D 57/032
USPC ................... 180/8.1, 8.5, 8.6; 701/50
See application file for complete search history.

(56) References Cited

U.S. PATENT DOCUMENTS

| | | | |
|---|---|---|---|
| 1,001,299 A | 8/1911 | Page | |
| 1,242,635 A | 10/1917 | Anderson | |
| 1,879,446 A | 9/1932 | Page | |
| 2,132,184 A | 10/1938 | Poche | |
| 2,259,200 A | 10/1941 | Cameron et al. | |
| 2,541,496 A | 2/1951 | Busik, Jr. et al. | |
| 2,914,127 A * | 11/1959 | Ricouard | B62D 57/00 180/8.5 |
| 2,942,676 A * | 6/1960 | Kraus | B62D 57/00 180/8.5 |
| 3,334,849 A | 8/1967 | Bronder | |
| 3,362,553 A | 1/1968 | Weinmann | |
| 3,527,313 A * | 9/1970 | Reimann | B62D 57/02 180/8.5 |
| 3,576,225 A * | 4/1971 | Chambers | B65G 7/02 180/8.5 |
| 3,754,361 A | 8/1973 | Branham et al. | |

(Continued)

*Primary Examiner* — Ruth Ilan
*Assistant Examiner* — Conan D Duda
(74) *Attorney, Agent, or Firm* — J. Curtis Edmondson; Law Offices of J. Curtis Edmondson

(57) ABSTRACT

Embodiments relate to a system or method for moving a load, the apparatus may include a control panel comprising an assemblage of one or more directional switches that are configured to activate a lift mechanism structure to lift a load-bearing frame supporting the load. The one or more directional switches configured to adjust a travel mechanism that is coupled to a roller track and connected to an electrically positionable roller assembly and adjust a pin connector that is configured to connect a support foot to the roller track to allow the roller track to rotate relative to the support foot.

20 Claims, 33 Drawing Sheets

(56) References Cited

U.S. PATENT DOCUMENTS

| | | | |
|---|---|---|---|
| 3,807,519 A * | 4/1974 | Patch | B62D 57/00 180/8.5 |
| 3,921,739 A | 11/1975 | Rich et al. | |
| RE29,541 E | 2/1978 | Russell | |
| 4,135,340 A | 1/1979 | Cox | |
| 4,290,495 A | 9/1981 | Elliston | |
| 4,296,820 A | 10/1981 | Loftis | |
| 4,324,077 A | 4/1982 | Woolslayer | |
| 4,324,302 A * | 4/1982 | Rabinovitch | B62D 57/00 180/8.5 |
| 4,371,041 A | 2/1983 | Becker | |
| 4,375,892 A | 3/1983 | Jenkins et al. | |
| 4,759,414 A | 7/1988 | Willis | |
| 4,821,816 A | 4/1989 | Willis | |
| 4,823,870 A | 4/1989 | Sorokan | |
| 4,831,795 A | 5/1989 | Sorokan | |
| 5,248,005 A | 9/1993 | Mochizuki | |
| 5,492,436 A | 2/1996 | Suksumane | |
| 5,794,723 A | 8/1998 | Caneer | |
| 5,854,988 A * | 12/1998 | Davidson | E02F 9/26 701/50 |
| 5,884,205 A * | 3/1999 | Elmore | A01B 79/005 222/63 |
| 5,897,600 A * | 4/1999 | Elmore | A01C 17/006 172/4.5 |
| 5,919,242 A * | 7/1999 | Greatline | A01C 15/00 701/50 |
| 5,921,336 A * | 7/1999 | Reed | B62D 57/00 180/8.1 |
| 6,266,595 B1 * | 7/2001 | Greatline | A01B 79/005 340/990 |
| 6,474,926 B2 | 11/2002 | Weiss | |
| 6,490,539 B1 * | 12/2002 | Dickson | A01B 69/008 180/168 |
| 6,554,145 B1 | 4/2003 | Fantuzzi | |
| 6,581,525 B2 | 6/2003 | Smith | |
| 6,655,465 B2 * | 12/2003 | Carlson | E02F 3/847 172/4.5 |
| 7,182,163 B1 | 2/2007 | Gipson | |
| 7,308,953 B2 | 12/2007 | Barnes | |
| 7,451,030 B2 * | 11/2008 | Eglington | A01B 69/008 701/25 |
| 7,516,563 B2 * | 4/2009 | Koch | E02F 3/435 37/348 |
| 7,681,674 B1 * | 3/2010 | Barnes | B60P 1/00 180/6.48 |
| 7,885,735 B2 * | 2/2011 | Katzer | A63H 19/24 105/1.5 |
| 7,941,158 B2 * | 5/2011 | Olson | G06Q 50/02 455/456.1 |
| 8,051,930 B1 * | 11/2011 | Barnes | B62D 57/028 180/8.3 |
| 8,209,075 B2 * | 6/2012 | Senneff | G05D 1/0219 701/23 |
| 8,250,816 B2 | 8/2012 | Donnally | |
| 8,326,469 B2 * | 12/2012 | Phillips | G05D 1/0088 701/2 |
| 8,468,753 B2 | 6/2013 | Donnally | |
| 8,515,626 B2 * | 8/2013 | Chiocco | A01B 69/008 172/1 |
| 8,556,003 B2 | 10/2013 | Souchek | |
| 8,583,326 B2 * | 11/2013 | Collins | G05D 1/0219 701/41 |
| 8,887,800 B2 | 11/2014 | Havinga et al. | |
| 8,914,215 B2 * | 12/2014 | Faivre | B60W 50/0098 701/84 |
| 8,918,230 B2 * | 12/2014 | Chen | G05D 1/0038 701/2 |
| 8,954,243 B2 * | 2/2015 | Harshberger | G01G 19/10 701/50 |
| 10,682,134 B2 * | 6/2020 | Shelton, IV | A61B 17/068 |
| 2002/0185319 A1 * | 12/2002 | Smith | B62D 55/00 180/9 |
| 2003/0051631 A1 * | 3/2003 | Ring | A63H 19/24 105/1.5 |
| 2004/0211598 A1 | 10/2004 | Palidis | |
| 2004/0240973 A1 | 12/2004 | Andrews et al. | |
| 2005/0192732 A1 * | 9/2005 | Narisawa | B66C 23/905 701/50 |
| 2006/0027373 A1 | 2/2006 | Carriere | |
| 2006/0178820 A1 * | 8/2006 | Eglington | G01C 21/005 701/533 |
| 2006/0213653 A1 | 9/2006 | Cunningham et al. | |
| 2006/0226298 A1 * | 10/2006 | Pierson | A63H 19/24 246/1 R |
| 2006/0241838 A1 * | 10/2006 | Mongiardo | B60K 35/00 701/50 |
| 2008/0202777 A1 * | 8/2008 | Corcoran | E02D 1/027 172/1 |
| 2009/0037058 A1 * | 2/2009 | Senneff | A01B 79/005 701/50 |
| 2009/0038282 A1 * | 2/2009 | Avalle | G05G 9/047 56/10.8 |
| 2009/0114386 A1 | 5/2009 | Hartog et al. | |
| 2009/0200856 A1 | 8/2009 | Chehade | |
| 2009/0259373 A1 * | 10/2009 | Nichols | E02F 9/264 701/50 |
| 2009/0278839 A1 * | 11/2009 | Geis | B60K 35/00 345/418 |
| 2009/0283324 A1 | 11/2009 | Konduc et al. | |
| 2010/0023229 A1 * | 1/2010 | Chiocco | A01B 69/003 701/50 |
| 2011/0106339 A1 * | 5/2011 | Phillips | G05D 1/0033 701/2 |
| 2011/0109549 A1 * | 5/2011 | Robbins | G05D 1/0016 345/161 |
| 2011/0178677 A1 * | 7/2011 | Finley | E02F 9/265 701/31.4 |
| 2011/0270494 A1 * | 11/2011 | Imhof | A01D 57/20 701/50 |
| 2011/0301817 A1 * | 12/2011 | Hobenshield | E02F 9/26 701/50 |
| 2012/0095653 A1 * | 4/2012 | Morath | B66C 23/905 701/50 |
| 2012/0101694 A1 * | 4/2012 | Morath | B66C 23/905 701/50 |
| 2013/0054075 A1 * | 2/2013 | Montgomery | E02F 9/262 701/25 |
| 2013/0103269 A1 * | 4/2013 | Meyer Zu Helligen | A01B 69/001 701/50 |
| 2013/0261901 A1 * | 10/2013 | Hendrickson | B60L 9/00 701/50 |
| 2013/0289832 A1 * | 10/2013 | Pirotais | G05D 1/021 701/50 |
| 2014/0064897 A1 * | 3/2014 | Montgomery | E02F 9/262 414/685 |
| 2014/0156153 A1 * | 6/2014 | Faivre | G07C 5/0841 701/50 |
| 2014/0158342 A1 * | 6/2014 | Smith | B62D 57/02 166/85.1 |
| 2014/0324291 A1 * | 10/2014 | Jones | G05D 1/0278 701/41 |
| 2014/0343803 A1 * | 11/2014 | Losch | G05D 1/0276 701/50 |
| 2015/0046043 A1 * | 2/2015 | Bollin | B60W 50/08 701/50 |
| 2015/0081176 A1 * | 3/2015 | Paull | E02F 3/436 701/50 |
| 2015/0175397 A1 * | 6/2015 | Lynn | B66F 9/24 187/222 |
| 2015/0190925 A1 * | 7/2015 | Hoffman | B25J 9/161 700/257 |
| 2015/0261379 A1 * | 9/2015 | Kneuper | G01C 23/00 345/173 |
| 2016/0010311 A1 * | 1/2016 | Paull | E02F 3/433 701/50 |
| 2016/0017571 A1 * | 1/2016 | Paull | E02F 3/437 701/50 |

(56) References Cited

U.S. PATENT DOCUMENTS

| | | | | |
|---|---|---|---|---|
| 2016/0029546 | A1* | 2/2016 | Komatsu | A01B 71/02 |
| | | | | 701/50 |
| 2016/0031447 | A1* | 2/2016 | Kobayashi | B60W 50/14 |
| | | | | 701/50 |
| 2016/0251835 | A1* | 9/2016 | Kitajinna | E02F 3/32 |
| | | | | 701/50 |
| 2017/0017392 | A1* | 1/2017 | Castaneda | B60K 35/00 |
| 2017/0233958 | A1* | 8/2017 | Utterodt | E01C 19/4833 |
| | | | | 701/50 |
| 2017/0233984 | A1* | 8/2017 | Humphrey | E02F 9/265 |
| | | | | 701/50 |
| 2017/0236330 | A1* | 8/2017 | Seif | G06F 3/013 |
| | | | | 345/633 |
| 2018/0143734 | A1* | 5/2018 | Ochenas | B66F 9/0759 |
| 2018/0188723 | A1* | 7/2018 | Lee | G05D 1/0094 |
| 2018/0232097 | A1* | 8/2018 | Kneuper | G08G 5/0034 |
| 2019/0144247 | A1* | 5/2019 | Albinger | B66C 23/76 |
| | | | | 701/50 |
| 2019/0146426 | A1* | 5/2019 | Blank | G05D 1/0011 |
| | | | | 701/50 |

\* cited by examiner

CONTROL SYSTEM FOR LOAD TRANSPORTATION DEVICE

RELATED APPLICATIONS

The present application is a continuation-in-part of U.S. patent application Ser. No. 14/529,566, filed on Oct. 31, 2014, now U.S. Pat. No. 9,533,723, which is a continuation-in-part of U.S. patent application Ser. No. 13/909,969, filed Jun. 4, 2013, now U.S. Pat. No. 9,096,282, which claims priority to U.S. Provisional Application No. 61/757,517, filed Jan. 28, 2013; and is a continuation-in-part of U.S. patent application Ser. No. 13/711,193 filed Dec. 11, 2012, now U.S. Pat. No. 8,873,334; and is a continuation-in-part of U.S. patent application Ser. No. 13/711,269, filed Dec. 11, 2012, now U.S. Pat. No. 8,561,733, which claims priority to U.S. Provisional Application 61/576,657; and is a continuation-in-part of U.S. patent application Ser. No. 13/711,315, filed Dec. 11, 2012, now U.S. Pat. No. 8,490,072, the contents of which are hereby incorporated by reference in their entireties. The benefit of priority is claimed under the appropriate legal basis including, without limitation, under 35 U.S.C. § 119(e).

FIELD OF THE INVENTION

This disclosure relates generally to a control system for the transporting of heavy loads, and more particularly to apparatuses for moving heavy loads over small distances with the ability of the control system to fine tune the resultant position of the heavy load.

BACKGROUND

Moving extremely heavy loads has generally been a complicated task because of the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines.

U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, the system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult. While, the '336 patent issued to Reed describes a master control system for communicating with the jack pads, but does not described a control system that provides steering walking systems. Likewise, the '525 patent issued to Smith does not describe a control system that provides steering to walking systems.

What is needed is a control system for an assemblage of walking machines to improve the coordination of the individual walking machines for the purpose of directing and steering the heavy load.

SUMMARY

Embodiments are directed to apparatuses for transporting loads, where the apparatuses are structured to steer the loads in order to efficiently move the loads between set positions.

In some embodiments, a load transporting apparatus that is capable of being steered while transporting a load across a base surface is provided. In these embodiments, the load transporting apparatus includes a roller track configured to support movement of a roller assembly, and a support foot that is connected to the roller track with a pin connector. During load transport, the support foot can be maintained in a substantially similar position relative to a frame structure supporting the load even when the transport movement is not in a parallel direction to the orientation of the support foot.

Some embodiments relate to an apparatus for moving a load, the apparatus may include a control panel comprising an assemblage of one or more directional switches that are configured to activate a lift mechanism structure to lift a load-bearing frame supporting the load. The one or more directional switches configured to adjust a travel mechanism that is coupled to a roller track and connected to an electrically positionable roller assembly and adjust a pin connector that is configured to connect a support foot to the roller track to allow the roller track to rotate relative to the support foot.

Other embodiments relate to a method for moving a load, the method including providing a control panel comprising an assemblage of one or more directional switches that are configured to activate a lift mechanism structure to lift a load-bearing frame supporting the load. The method includes adjusting a travel mechanism, using the one or more directional switches, the travel mechanism being coupled to a roller track and connected to an electrically positionable roller assembly and adjusting the pin connector, using the one or more directional switches, to adjust a pin connector that is configured to connect a support foot to the roller track to allow the roller track to rotate relative to the support foot.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
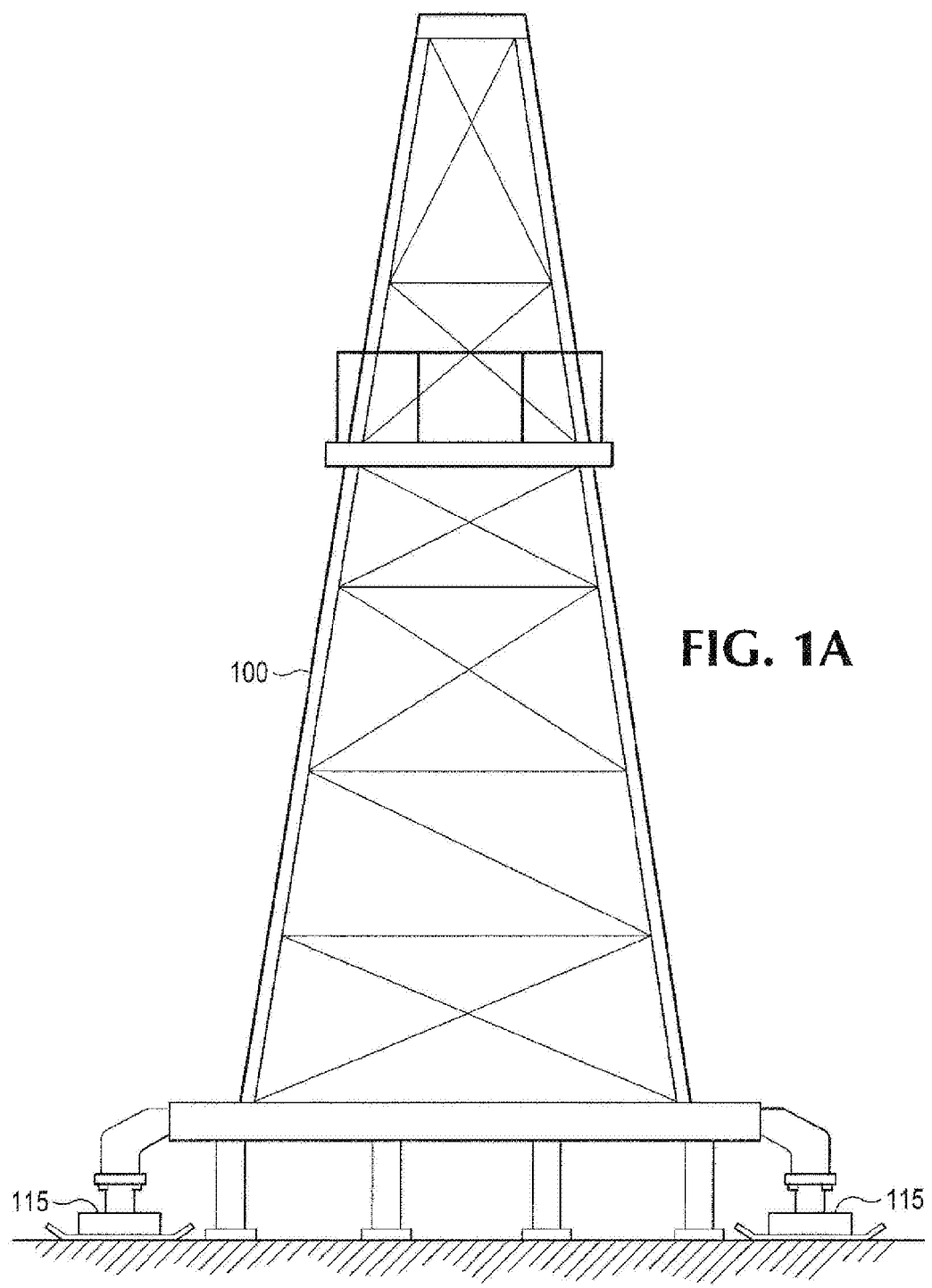
FIGS. 1A and 1B are diagrams of walking apparatuses attached to various loads according to embodiments of the invention.
Figure 1B:
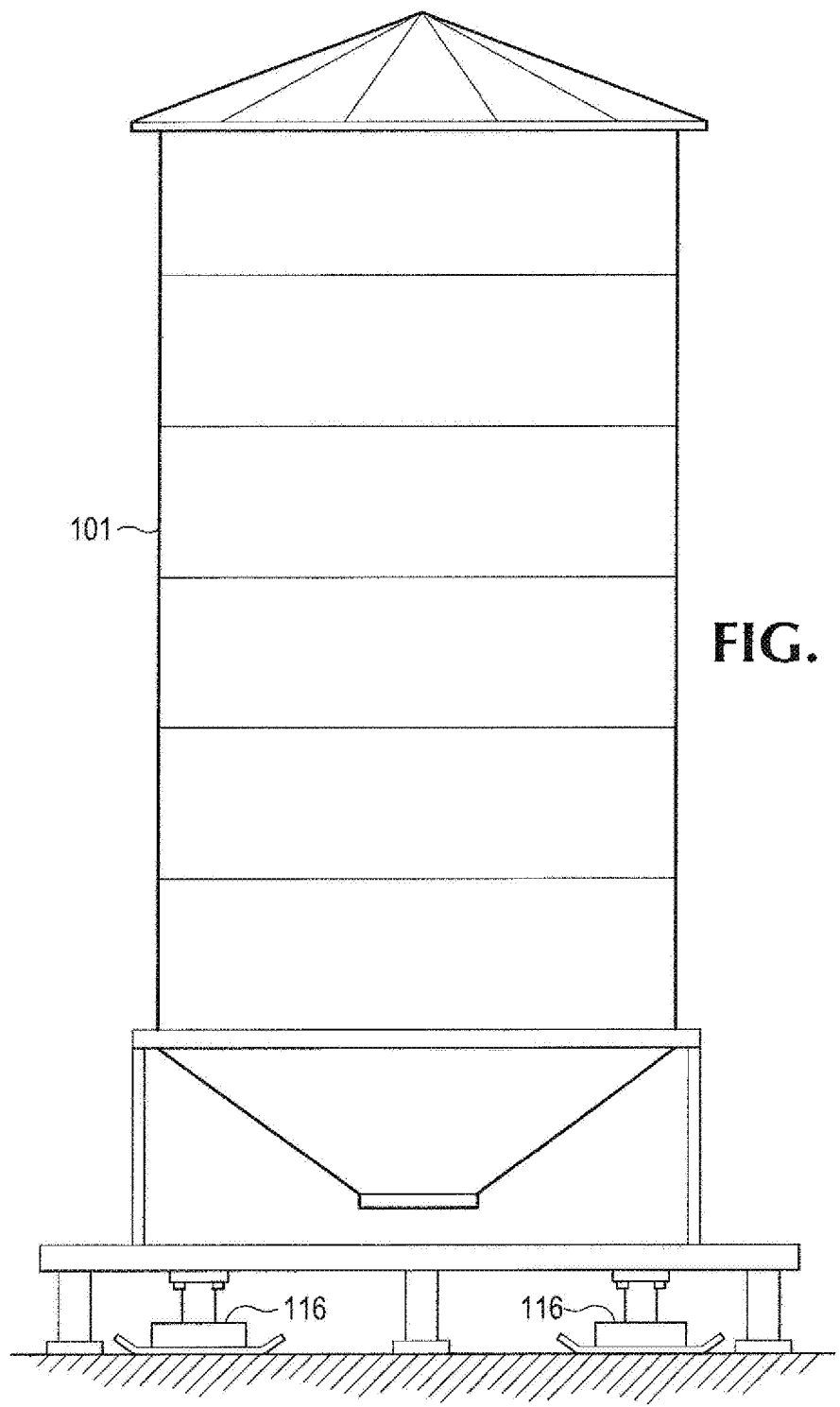

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
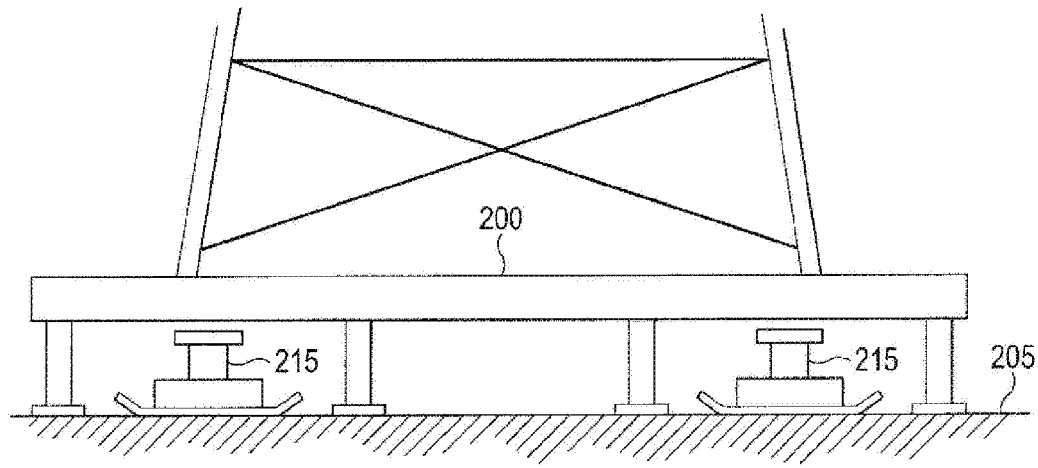
FIGS. 2A, 2B, 2C, 2D, 2E, and 2F are detail diagrams showing an example operational progression of walking apparatuses to move a load according to embodiments of the invention.
Figure 2B:
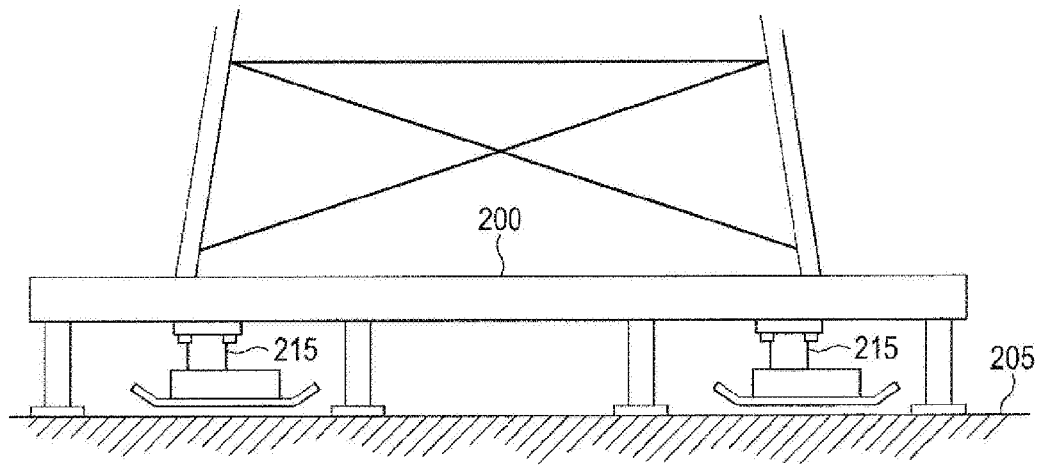
Figure 2C:
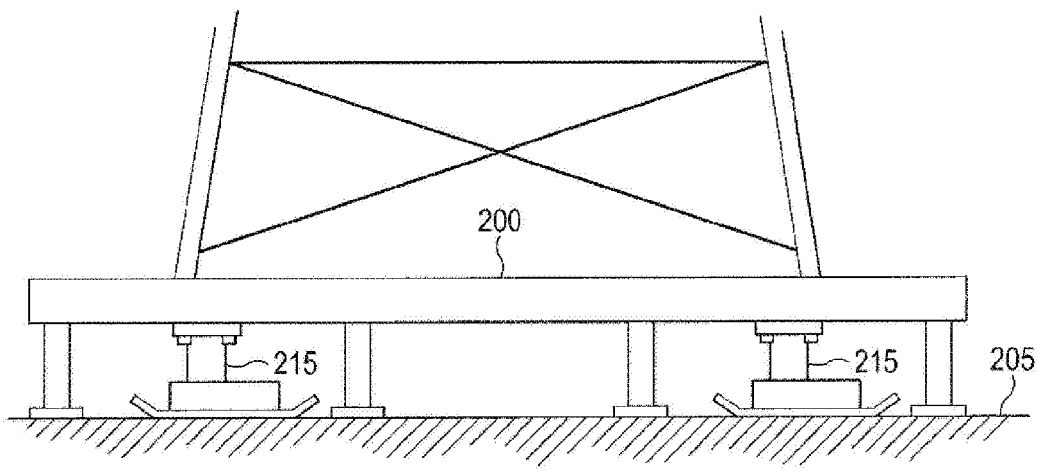

FIGS. 2A-2F provide an overview of an example operation of walking apparatuses to move a load according to various embodiments. Referring to FIG. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
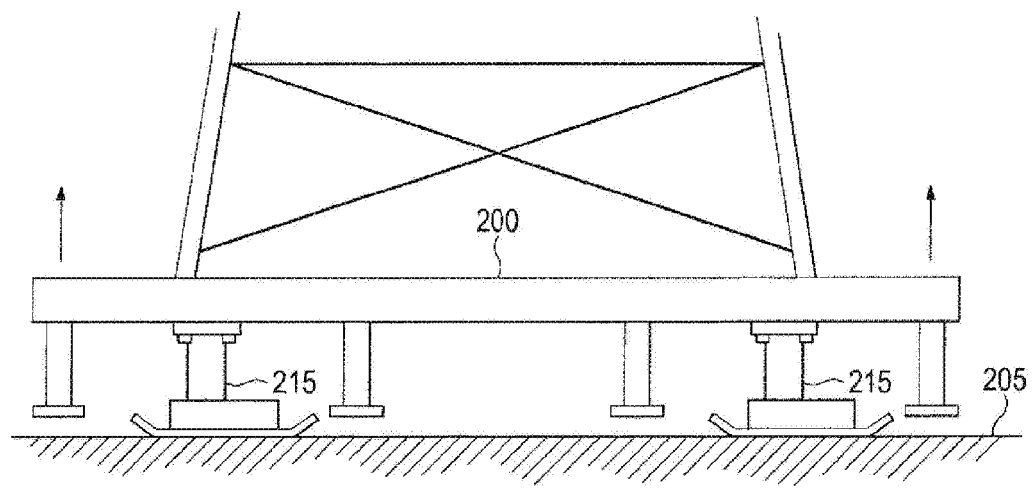

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
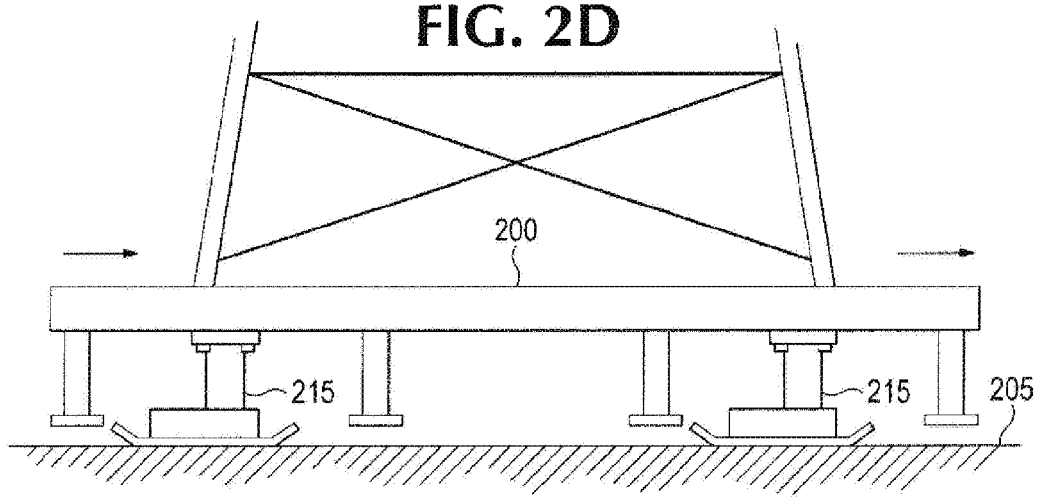
Figure 2F:
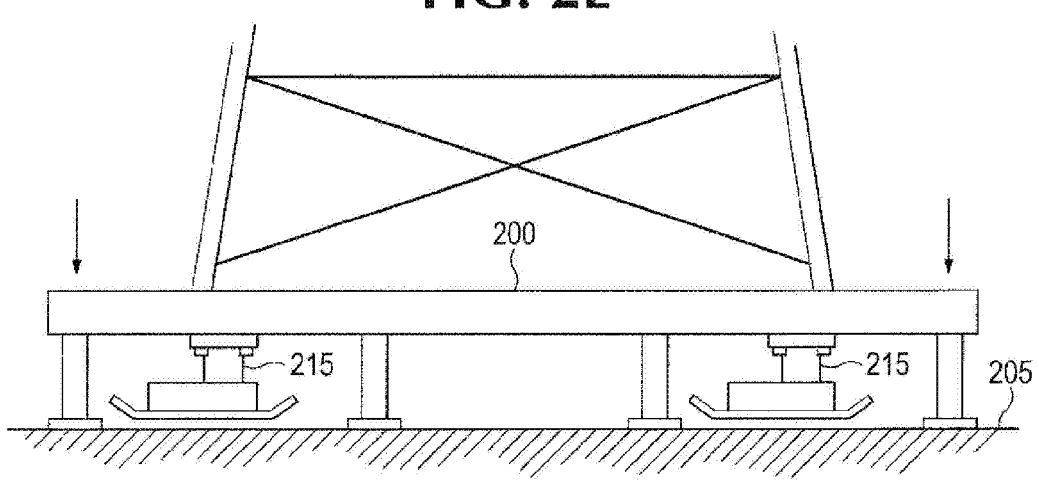

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface 205. That is, after the load 200 is positioned on the base surface 205, the walking apparatuses 215 are further operated so that they are raised above the base surface 205. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the portion of the base surface 205 that is in contact with part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2B to 2F.

Figure 3A:
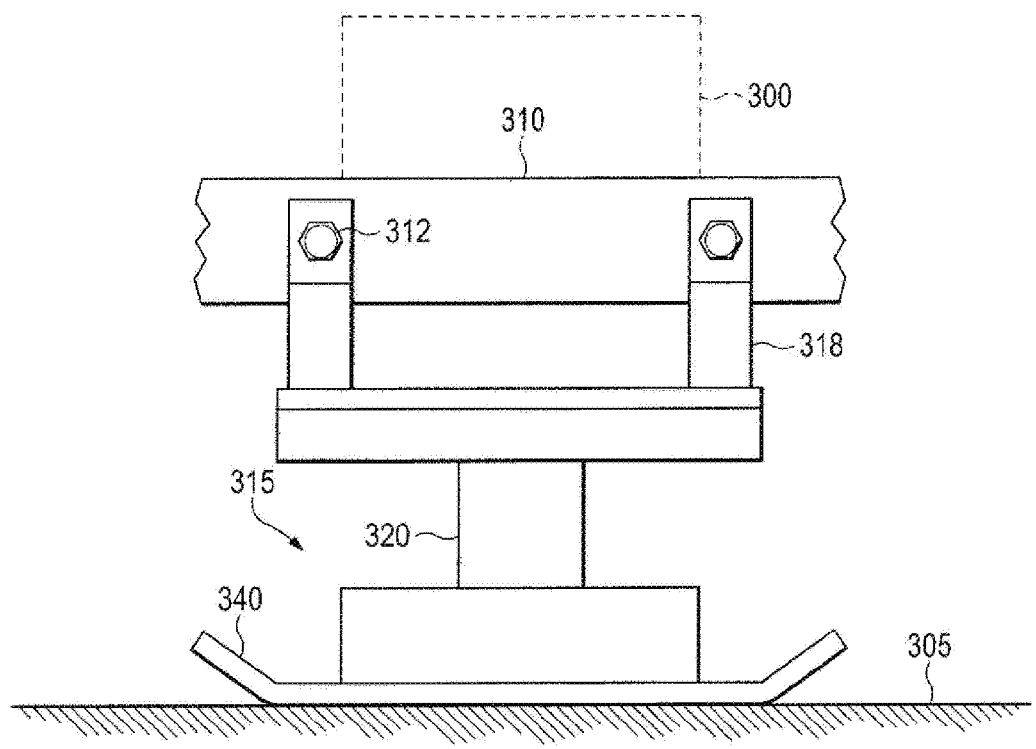
FIGS. 3A and 3B are diagrams illustrating example connection arrangements used to connect a walking apparatus to a load according to embodiments of the invention.
Figure 3B:
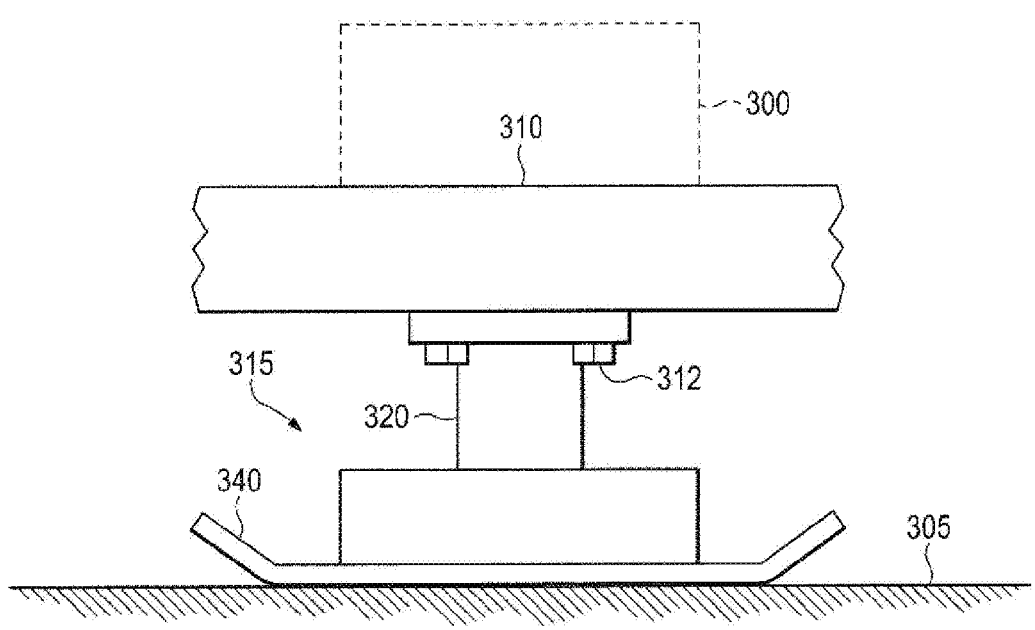

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted or attached to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
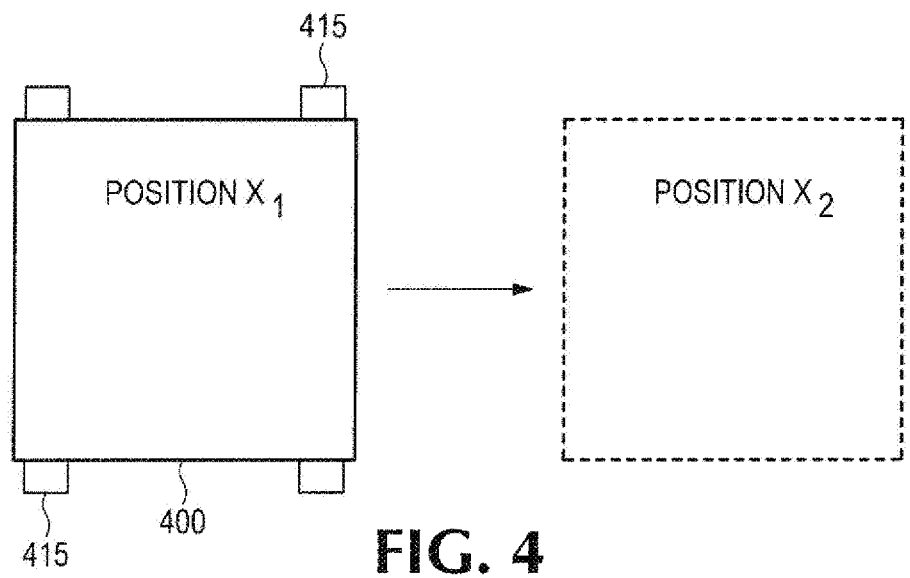
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
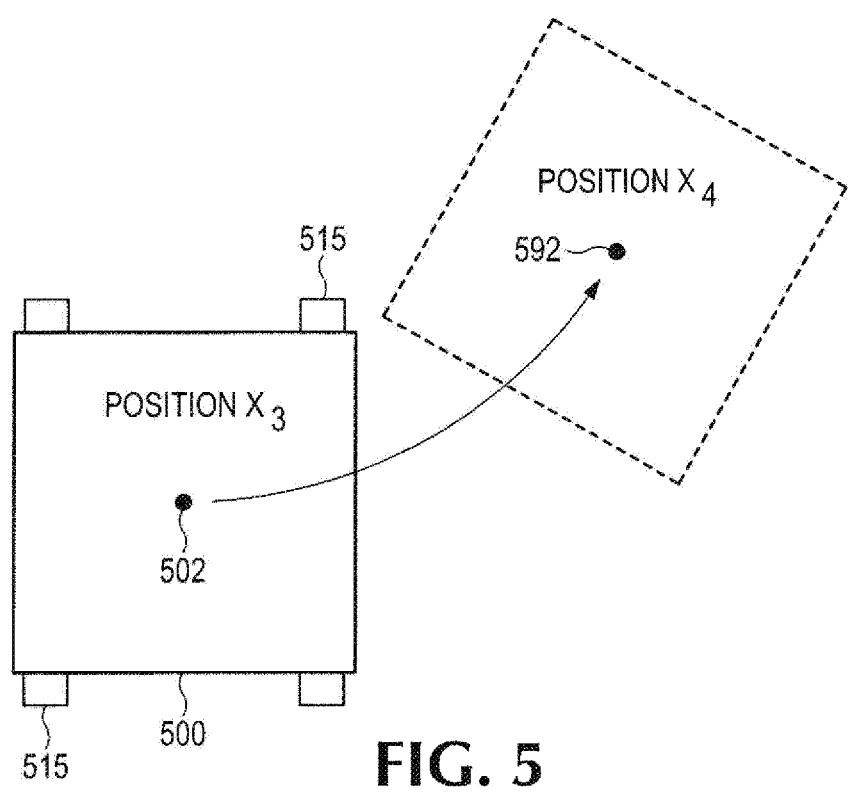
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6A:
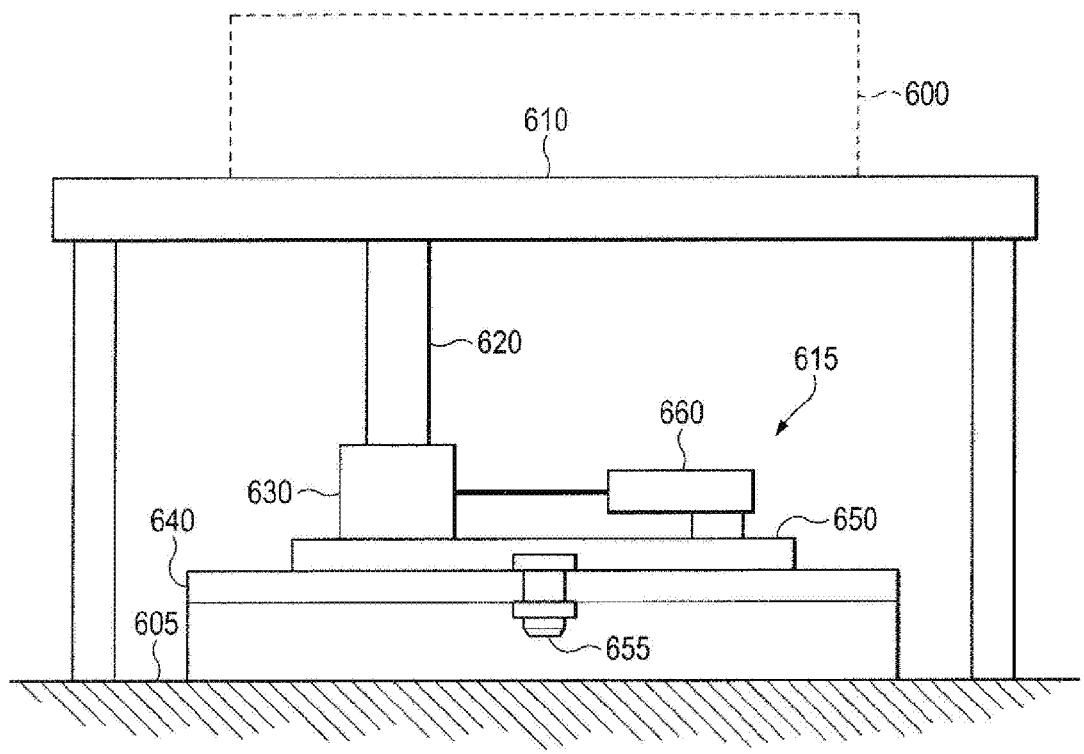
FIG. 6A is a schematic diagram of a side view of a walking apparatus according to embodiments of the invention.
Figure 6B:
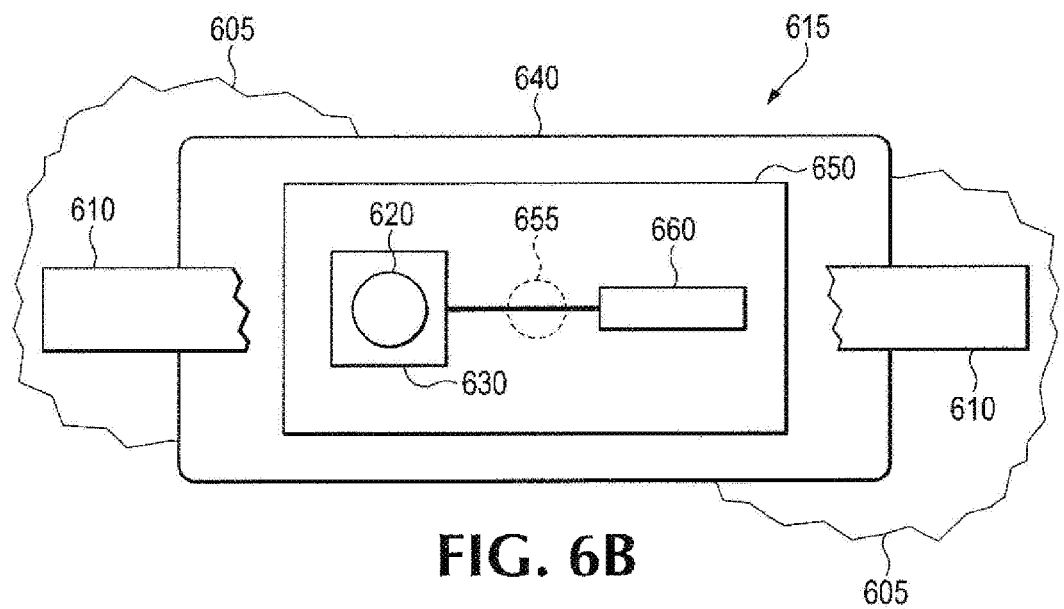
FIG. 6B is a schematic diagram of a top view of a walking apparatus according to embodiments of the invention.

FIGS. 6A and 6B are schematic side and top views of a walking apparatus according to embodiments of the invention. Referring to FIGS. 6A and 6B, a load transporting apparatus 615 is shown that is configured to move a load 600 over a base surface 605 in one or more incremental steps, each including a load-movement phase and a recovery phase. The load transporting apparatus 615 includes a lift mechanism 620 structured to lift a load-bearing frame 610 supporting the load 600, and a roller assembly 630 coupled to the lift mechanism. A roller track 650 is connected to the roller assembly 630 and configured to allow the roller assembly to move over the roller track in a first direction. The load transporting apparatus 615 also includes a travel mechanism 660 coupled to the roller track 650 and connected to the roller assembly 630, the travel mechanism structured to displace the roller assembly relative to the roller track along the first direction. A support foot 640 is also included in the load transporting apparatus 615. The support foot 640 is positioned below the roller track 650, and is structured to interface with the base surface 605. A pin connector 655 is used to connect the support foot 640 with the roller track 650, and is structured to allow the roller track to rotate relative to the support foot.

In these embodiments, the roller track 650 is separate from, but connected to the support foot 640 that contacts the base surface 605. As discussed above, the support foot 640 is connected to the roller track 650 with a pin connector 655, which allows the roller track to rotate relative to the support foot. This means that the support foot 640 can be oriented in a first direction while the roller track 650 is oriented in a second direction. As discussed in more detail below, this ability to vary the orientations of the roller track 650 and support foot 640 allows the load supporting apparatus 615 to be precisely steered, which in turns allows a load 600 to be moved more efficiently between locations.

In some embodiments, the pin connector 655 is a king pin connector that allows rotation about an axis in one degree of freedom, while limiting movement in other planes of travel. In some embodiments, the pin connector may further include a bearing (not shown) to facilitate smooth rotational movements. However, because of the heavy weight associated with the loads 600 being moved by the walking apparatus 615, other embodiments do not have a bearing to prevent damage to the internal structure of a bearing.

Figure 7A:
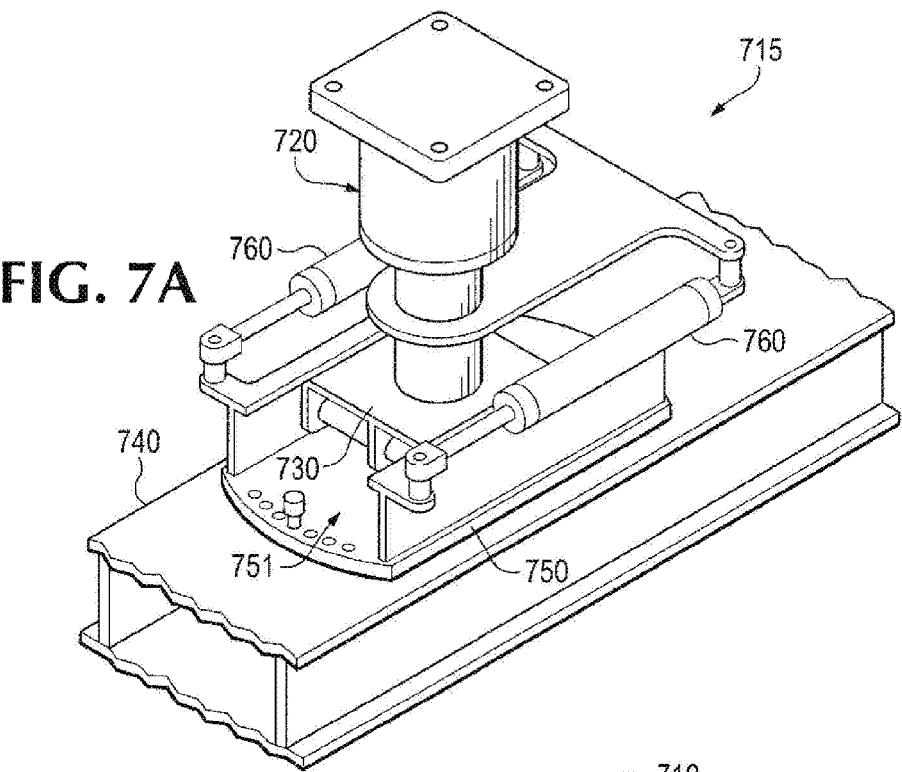
FIG. 7A is a perspective view of a walking apparatus according to embodiments of the invention.
Figure 7B:
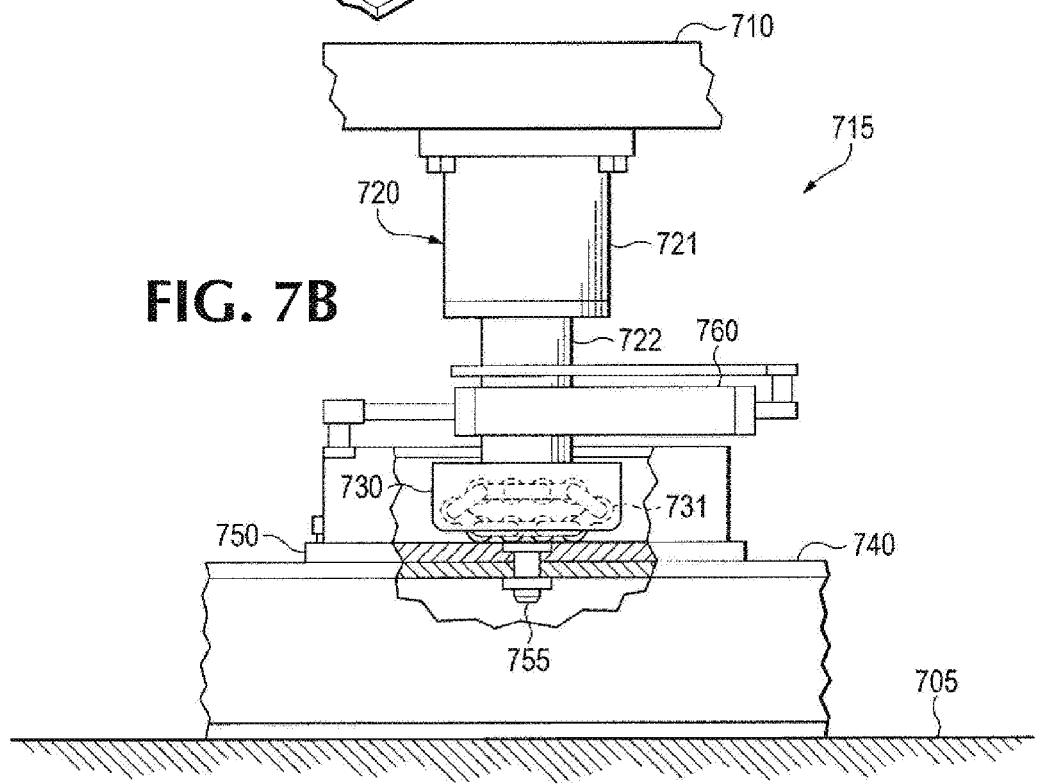
FIG. 7B is a side view of the walking apparatus shown in FIG. 7A.

FIGS. 6A and 6B are presented in a schematic style view as many possible variations in the appearance and mechanical structure of the load transporting apparatus 615 exist. FIGS. 7A and 7B provide a more detailed view of one embodiment of a load transporting apparatus. FIG. 7A is a perspective view of a walking apparatus according to embodiments of the invention. FIG. 7B is a side view of the walking apparatus shown in FIG. 7A. Referring to FIGS. 7A and 7B, a load transporting or walking apparatus 715 is placed over a base surface 705. The walking apparatus 715 includes a lift mechanism 720, a roller assembly 730, a roller track 750, and a support foot 740. The lift mechanism 720 may include a hydraulic jack suspended from a horizontal beam of the load-bearing frame 710.

The lift mechanism 720 may include a lift cylinder 721 that is connected to a load-bearing frame 710, and a cylinder rod 722 coupled to the roller assembly 730. Here, the cylinder rod 722 may be structured to allow the roller assembly 730 to rotate about a substantially vertical axis in the center of the cylinder rod. That is, the roller assembly 730 may be free to rotate around the cylinder rod 722. The connection between the roller assembly 730 and the cylinder rod may be a bearing or one of a number of different connection variations. In one embodiment, the cylinder rod 722 may include a groove (not shown) around side edges of a lower portion of the cylinder rod, where the groove corresponds to a retainer cuff (not shown) of the roller assembly 730. In this example the retainer cuff is rotatable around the groove, but may easily be assembled or disassembled during installation, break-down, or transportation of the walking apparatus 715.

Although the embodiment shown in FIGS. 7A and 7B show the lift cylinder 721 connected to the load bearding frame 710 and the cylinder rod 722 connected to the roller apparatus 730, in other embodiments, the cylinder rod may be connected to the load-bearing frame, and the lift cylinder 721 may be connected to the roller apparatus. In these other embodiments, the cylinder may be structured to allow the roller assembly to rotate about a substantially vertical axis.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders 761 mounted on the roller track 750 on opposite sides of the roller track. Here, the travel cylinders 761 of the travel mechanism 760 may balance the load being moved by the roller assembly 730 over the roller track 750. In other embodiments, one travel cylinder 761, or three or more travel cylinders 761 may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain 731 that rotate as well as roll on the roller track 750. That is, in some embodiments, the roller assembly 730 may include a WBOT series roller assembly from Hillman Rollers, such as shown in FIG. 7B. Due to the configuration of the roller chain 731 of the roller assembly 730 and the tolerance between the roller assembly and the roller track 750 of the walking machine 715, the rollers of the roller chain will typically be engaged with the roller track during operation and use of the walking machine.

As discussed above, the roller assembly 730 may be secured to the lower end of the cylinder rod 722, with the roller assembly being captured within a U-shaped roller track 750 as shown in FIG. 7A. The roller assembly 730 may be configured to roll along the bottom inside surface of the roller track 750 as well as along the underside of the two upper flanges of the roller track. The one or more travel cylinders 761 may be coupled between the cylinder rod 722 and the roller track 750. Accordingly, as will be understood from the more detailed discussion below, these travel cylinders 761 permit for the translation of the roller track 750 relative to the lift mechanism 720 and vice versa. The roller track 750 may be secured to an elongate ground-engaging foot 740 (support foot) via a rotational pin 755, which enables the roller track 750 to be rotationally positioned relative to the foot for steering of the walking machine 715.

In some embodiments, the roller track 750 may include travel slots 751 structured to connect the roller assembly 730 to the roller track 750. Here, the travel slots 751 may be configured to allow substantially linear movement of the roller assembly 730 across the roller track 750.

As shown in co-pending application Ser. No. 13/711,269, entitled ALIGNMENT RESTORATION DEVICE FOR LOAD TRANSPORTING APPARATUS, the contents of which are herein incorporated by reference in their entirety, a walking apparatus 715 may also include one or more linking devices coupled to the support foot 740. One or more biasing devices may be coupled to the linking devices, where the biasing devices are structured to become activated during a load-movement phase when the roller assembly 730 travels in a direction that is not parallel or perpendicular to a lengthwise direction that the support foot 740 is oriented, and structured to return the support foot to an aligned position relative to the load-bearing frame 710 during a recovery phase.

In some embodiments, the one or more biasing devices may become activated when an angular displacement occurs between the support foot 740 and the load-bearing frame 710, where the activation of the one or more biasing devices includes a torqueing force being applied to the one or more biasing devices. In other embodiments, the linking devices may be structured to be connected to at least one other load transporting apparatus.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the roller assembly 730 travels in a direction that is not parallel or perpendicular to a lengthwise direction that the support foot 740 is oriented, and structured to return the support foot to a centered position relative to the support foot 740 during a recovery phase.

Figure 8A:
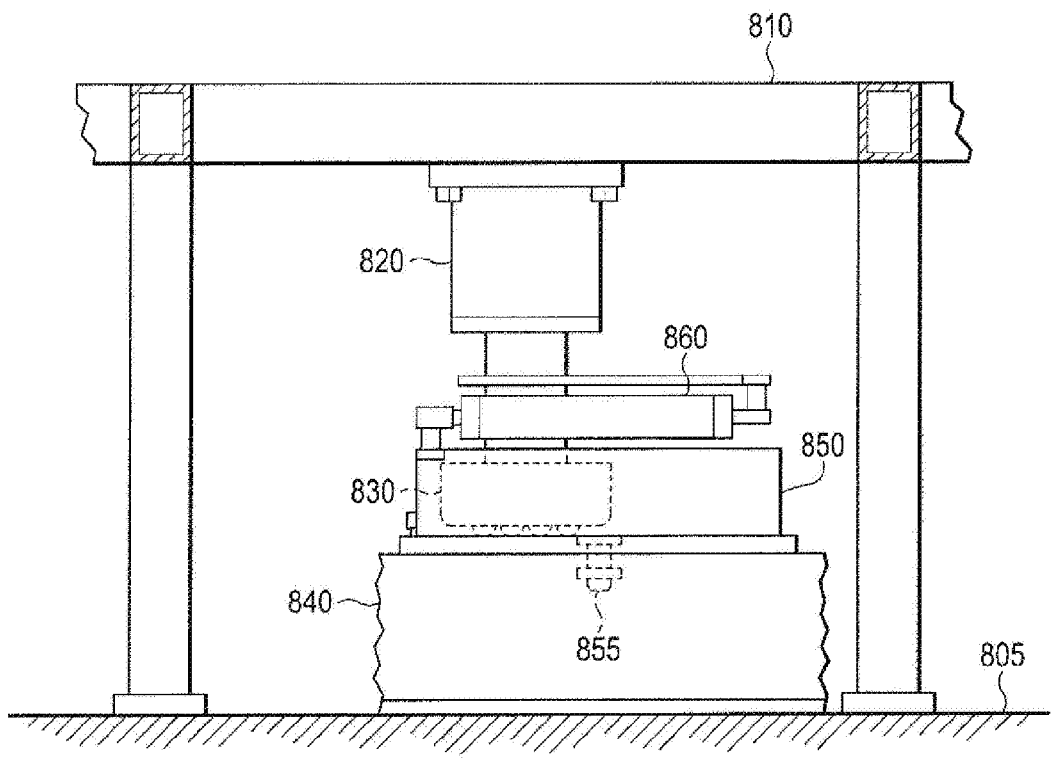
FIGS. 8A, 8B, 8C, 8D, 8E, and 8F are diagrams illustrating an example operation progression of a walking apparatus according to embodiments of the invention.

FIGS. 8A, 8B, 8C, 8D, 8E, and 8F are diagrams illustrating an example operation progression of a walking apparatus according to embodiments of the invention. Here, FIGS. 8D-8E may show a load-movement phase of a walking cycle, while FIG. 8F may show a recovery phase of a walking cycle. Referring to FIG. 8A, a walking apparatus includes a support foot 840 positioned on a base surface 805 and connected to roller track 850 via a rotation pin 855. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. As shown in FIG. 8A, the walking apparatus is in an operational position where it is both connected to the load-bearing frame 810 and positioned on the base surface 805.

Figure 8B:
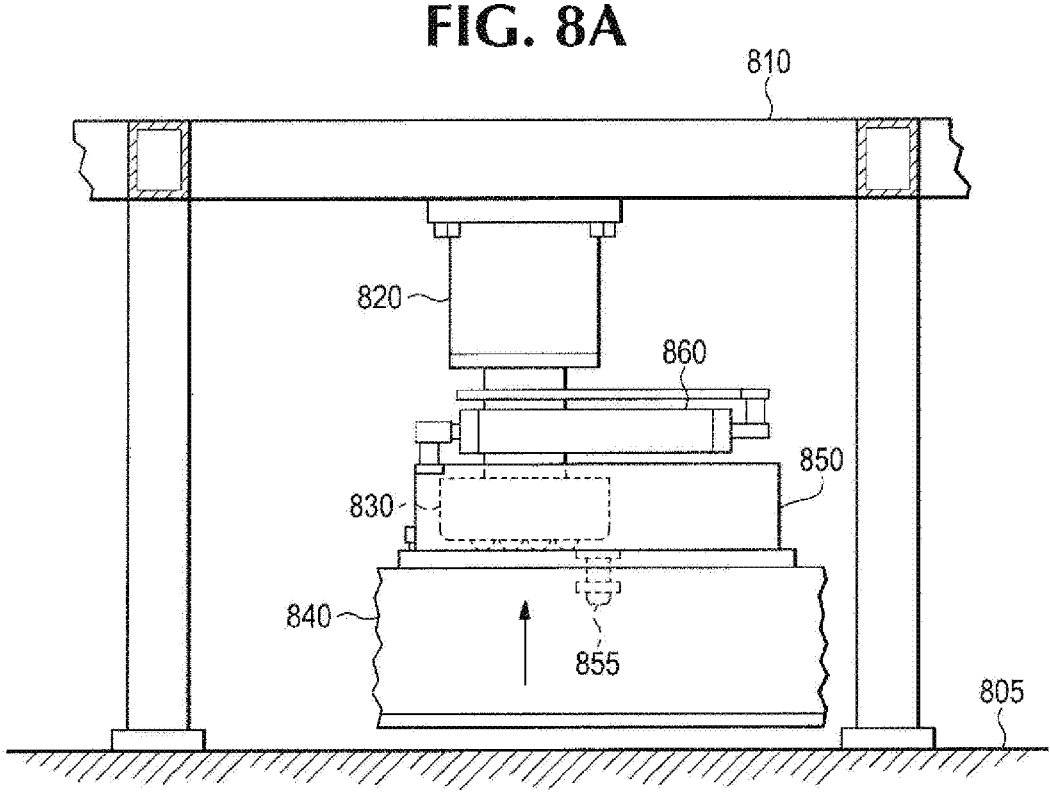

Referring to FIG. 8B, a step in a walking motion of the walking machine is illustrated. Specifically, as indicated by the vertical arrows pointing up, when the lift mechanism 820 is activated, the roller assembly 830, the roller track 850, and the foot 840 are lifted above the base surface or ground 805 as a single unit. This is due in part because the roller assembly 830, which is secured to the lower end of the travel mechanism 820, is captured by the roller track, as discussed above.

Figure 8C:
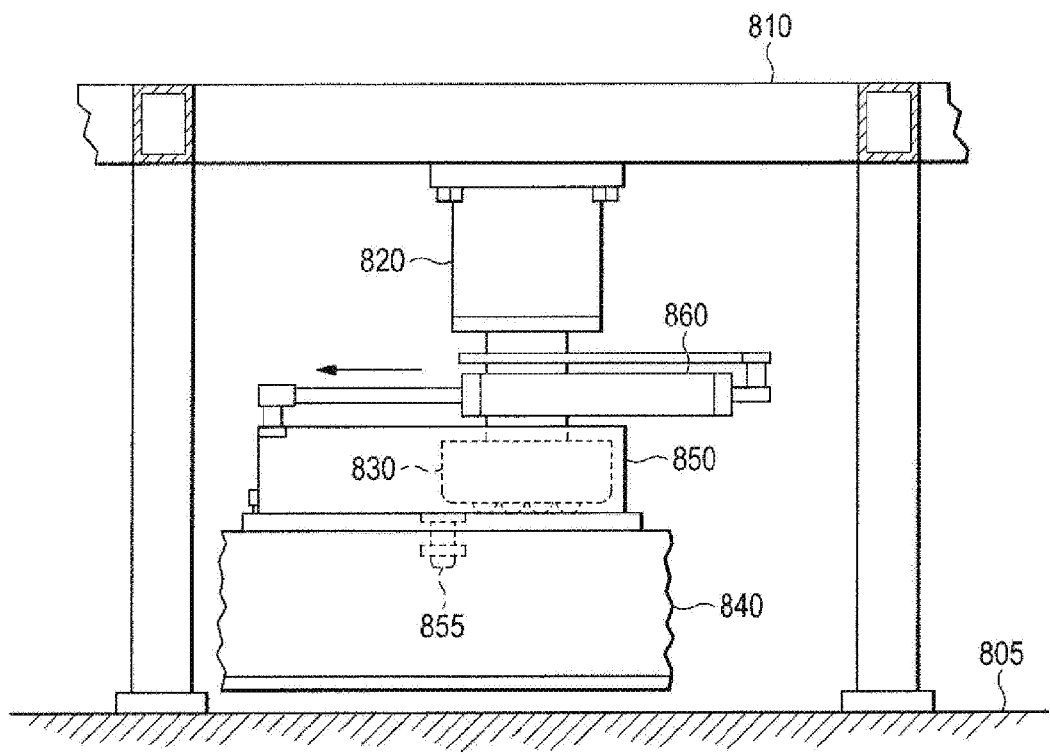

Referring to FIG. 8C, a next step in a walking motion of the walking machine is illustrated. Here, as indicated by the horizontal arrow pointing to the left, the travel cylinders 860 are extended to shift the roller track 850 to the left along the roller assembly 830. Because the roller track 850 is secured to the foot 840 via the rotation pin 855, the foot also is shifted to the left. The distance of travel of the foot 840 may be limited by the operable travel, or throw, of the travel cylinders 860. Because the lateral travel is limited, the roller tracks 850 only need to be long enough to accommodate the corresponding distance traveled by the roller assembly 830. As illustrated in FIG. 8C, this step occurs while the foot is lifted completely off of the base or ground surface 805, and with the full weight of the load being supported by the load-bearing or main frame 810 and its ground-engaging portions.

Figure 8D:
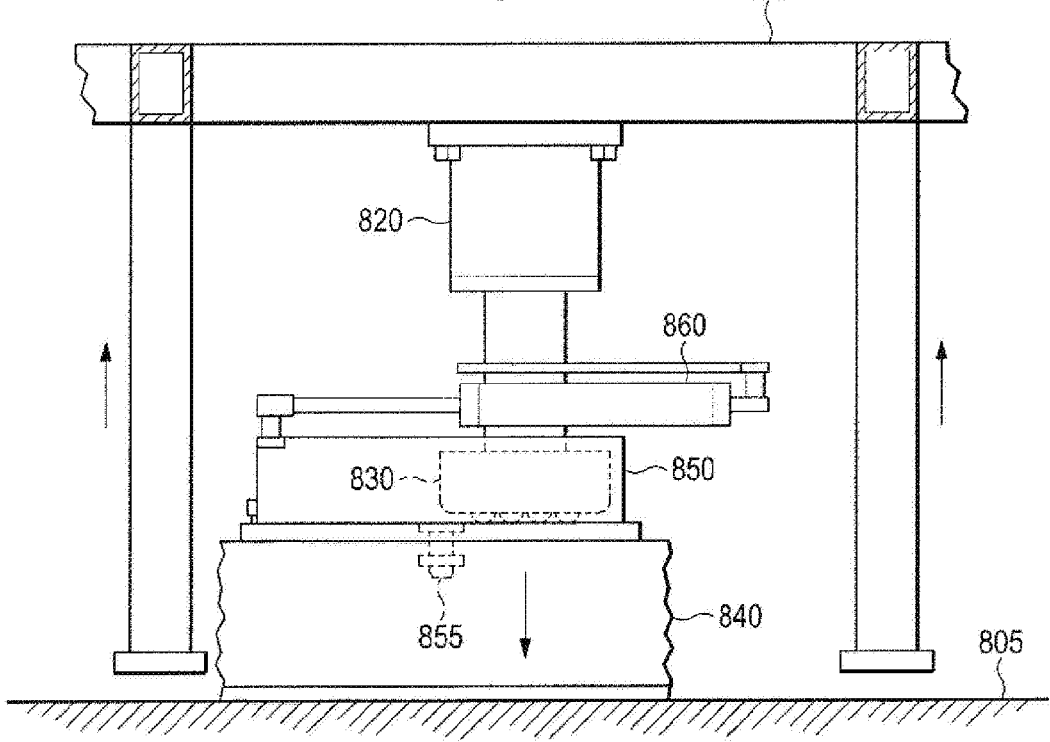

Referring to FIG. 8D, the next step of the walking process is shown. Here, the lift mechanism 820 is activated (i.e., the cylinder rod of the hydraulic jack is forced out of the lift cylinder 721) causing the foot 840 to engage the base surface 805. As the lift mechanism 820 continues to operate, the ground-engaging portions of the load-bearing frame 810 are lifted off of the base surface 805, so that the entire weight of the load is then supported by the support foot 840.

Figure 8E:
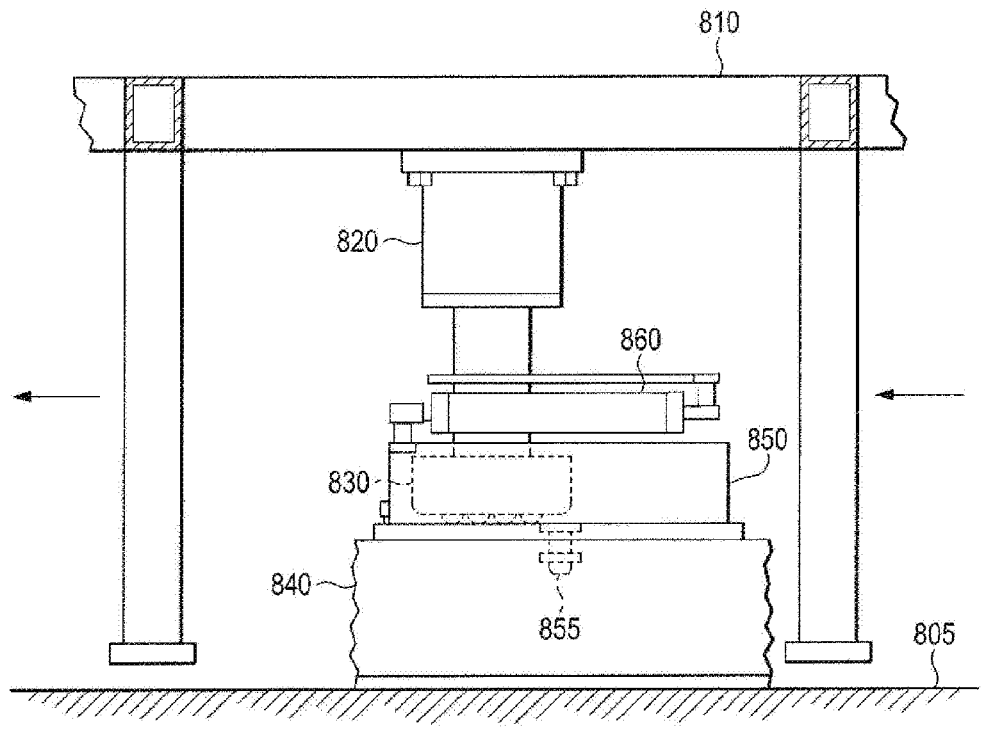

Referring to FIG. 8E, while the load-bearing frame 810 is lifted off of the base surface 805, and the foot 840 is supporting the load, the travel cylinders 860 are retracted, causing the entire load-bearing frame 810, including the supported load, to translate to the left, as indicated by the horizontal arrows pointing to the left in the view shown in FIG. 8E. As shown in this figure, the load-bearing frame 810 has shifted to the left away from its starting position, a distance corresponding to the operable throw of the travel cylinders 860. During this translation to the left, the roller assembly 830 rolls along the bottom inside surface of the roller track 850.

Figure 8F:
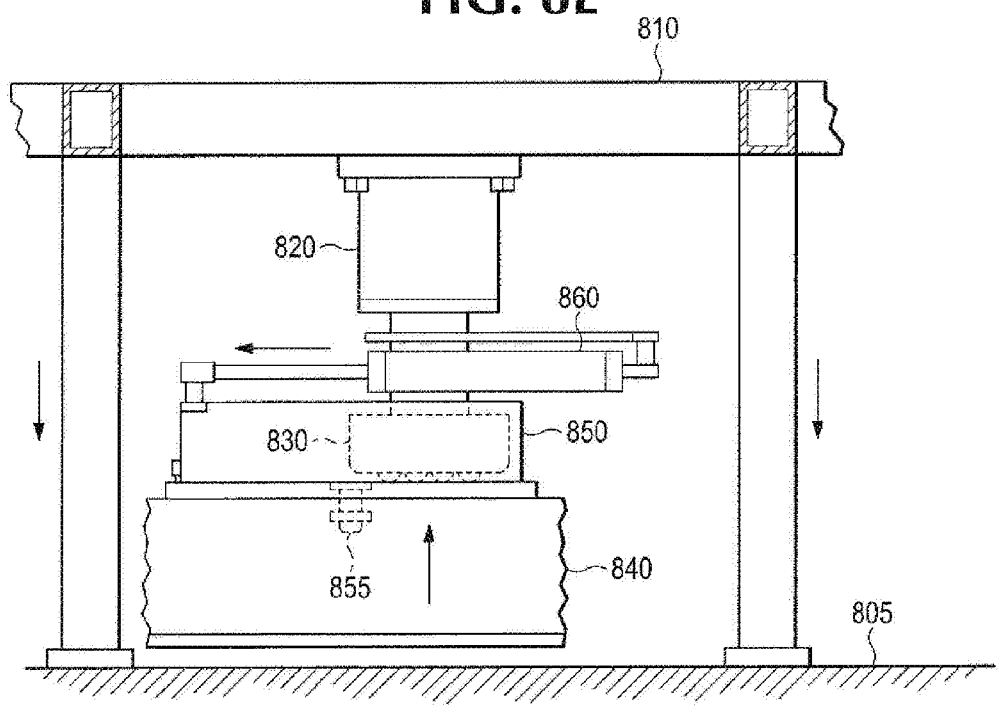

Referring to FIG. 8F, the rod of the lift mechanism 820 is retracted, which causes the load-bearing frame 810 to be lowered and to engage the base surface 805 and support the load. As the lift mechanism 820 continues to be activated, the foot 840 is lifted off of the base surface 805. Thus, the walking machine returns to a similar orientation as shown in FIG. 8B and FIG. 8C. To continue moving, the steps shown in FIGS. 8C-8F may be repeated. Accordingly, cycling through the above illustrated sequential steps will cause the walking apparatus to walk across the base surface 805.

Figure 9A:
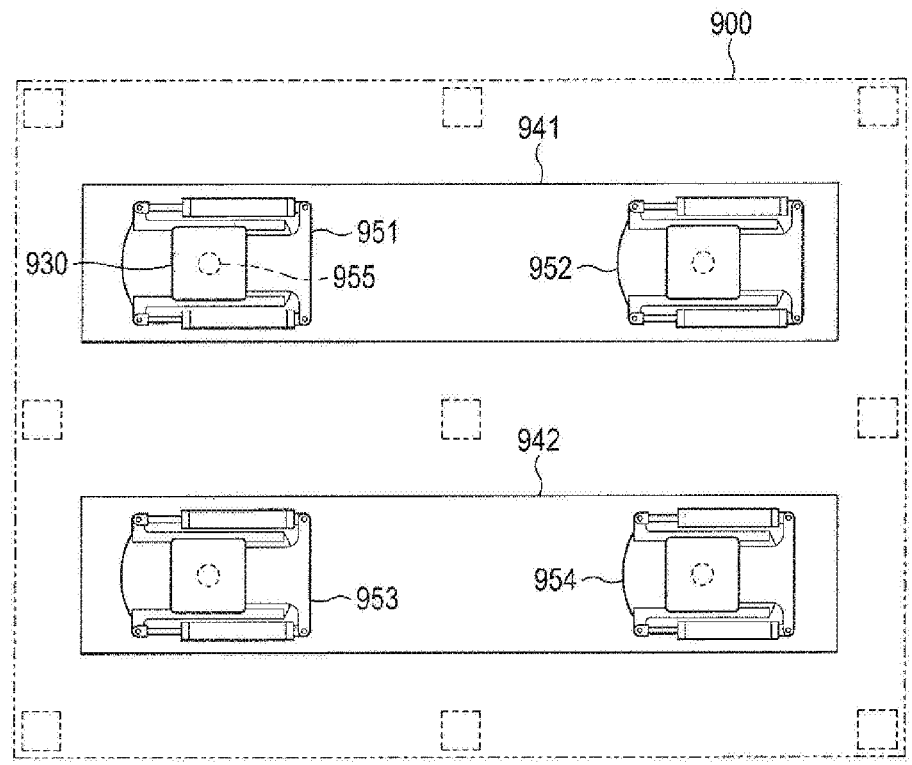
FIG. 9A is a plan view of walking apparatuses positioned below a load according to embodiments of the invention.
Figure 9B:
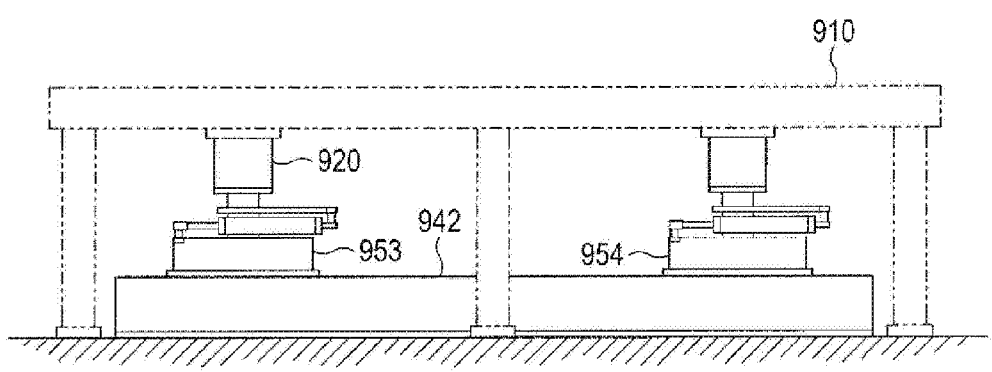
FIG. 9B is a side view of the walking apparatuses shown in FIG. 9A.

FIG. 9A is a plan view of walking apparatuses positioned below a load according to embodiments of the invention. FIG. 9B is a side view of the walking apparatuses shown in FIG. 9A. Referring to FIGS. 9A and 9B, a load 900 is supported by four walking apparatuses 951, 952, 953, 954. Here, a first walking apparatus 951 and third walking apparatus 952 are connected to a first support foot 941 and a second walking apparatus 953 and fourth walking apparatus 954 are connected to a second support foot 942. Each of the walking apparatuses 951, 952, 953, 954 include a roller assembly 930 and a rotation pin 955.

FIG. 9B illustrates a load transporting system that is configured to move a load 900 over a base surface in one or more incremental steps each including a load-movement phase and a recovery phase includes a load-bearing frame 910 structured to support the load 900 on the base surface. The load transporting system includes a first load transporting apparatus 951 including a first lift mechanism 920 coupled to the load-bearing frame 910 and structured to lift the load-bearing frame supporting the load 900. The first load transporting apparatus 951 also includes a first roller assembly 930 coupled to the first lift mechanism 920, a first roller track 931 connected to the first roller assembly and configured to allow the first roller assembly to move over the first roller track in a first direction, and a first travel mechanism coupled to the first roller track and connected to the first roller assembly, the first travel mechanism structured to displace the first roller assembly relative to the first roller track along the first direction. The first load transporting apparatus is connected to a first support foot 941 positioned below the first roller track, the first support foot structured to interface with the base surface. The first support foot 941 is connected to the first roller track with a first pin connector 955. The first pin connector 955 is structured to allow the first roller track 931 to rotate relative to the first support foot.

The load transporting system also includes a second load transporting apparatus 953 that includes a second lift mechanism 920 coupled to the load-bearing frame 910 and structured to lift the load-bearing frame supporting the load 900. The second load transporting apparatus 953 includes a second roller assembly 930 coupled to the second lift mechanism 920, a second roller track 931 connected to the second roller assembly 930 and configured to allow the second roller assembly 930b to move over the second roller track 931 in a second direction, and a second travel mechanism coupled to the second roller track and connected to the second roller assembly, the second travel mechanism structured to displace the second roller assembly relative to the second roller track along the second direction. The second load transporting apparatus is connected to a second support foot 942 positioned below the second roller track, the second support foot structured to interface with the base surface. The second support foot 942 is connected to the second roller track with a second pin connector 955. The second pin connector 955 is structured to allow the second roller track to rotate relative to the second support foot.

As shown in FIGS. 9A and 9B, however, additional walking apparatuses are connected to each support foot. In other embodiments, more than two walking apparatuses may be coupled to the same support foot. In other embodiments, more than two support feet with multiple walking machines are needed to safely and/or efficiently lift and transport a load. For example, a third load transporting apparatus 952 may be connected to the same first support foot 941 as the first load transporting apparatus 951, and a fourth load transporting apparatus 954 may be connected to the same second support foot 942 as the second load transporting apparatus 953.

Here the third load transporting apparatus 952 may include a third lift mechanism 920 coupled to the load-bearing frame 910 and structured to lift the load-bearing frame supporting the load 900. The third load transporting apparatus 952 may also include a third roller assembly 930 coupled to the third lift mechanism 920, a third roller track connected to the third roller assembly and configured to allow the third roller assembly to move over the third roller track in a first direction, and a third travel mechanism coupled to the third roller track and connected to the third roller assembly, the third travel mechanism structured to displace the third roller assembly relative to the third roller track along the first direction. A third pin connector 955 may connect the first support foot 941 with the third roller track, the third pin connector structured to allow the third roller track to rotate relative to the first support foot.

Additionally, the fourth load transporting apparatus 954 may include a fourth lift mechanism 920 coupled to the load-bearing frame 910 and structured to lift the load-bearing frame supporting the load 900. The fourth load transporting apparatus 954 may include a fourth roller assembly 930 coupled to the fourth lift mechanism 920, a fourth roller track connected to the fourth roller assembly and configured to allow the fourth roller assembly to move over the fourth roller track in a second direction, and a fourth travel mechanism coupled to the fourth roller track and connected to the fourth roller assembly, the fourth travel mechanism structured to displace the fourth roller assembly relative to the fourth roller track along the second direction. A fourth pin connector 955 may connect the second support foot 942 with the fourth roller track, the fourth pin connector structured to allow the fourth roller track to rotate relative to the second support foot.

As described above, embodiments of the disclosed walking machine are capable of being steered while transporting a load across a base or ground surface. Since each roller track is rotationally secured to a foot with a rotation or king pin, the roller track is able to be selectively rotated relative to the foot. FIGS. 10A-10E illustrated exemplary steering modes that that made possible by utilizing a rotational pin to connect the support foot to the roller track.

Figure 10A:
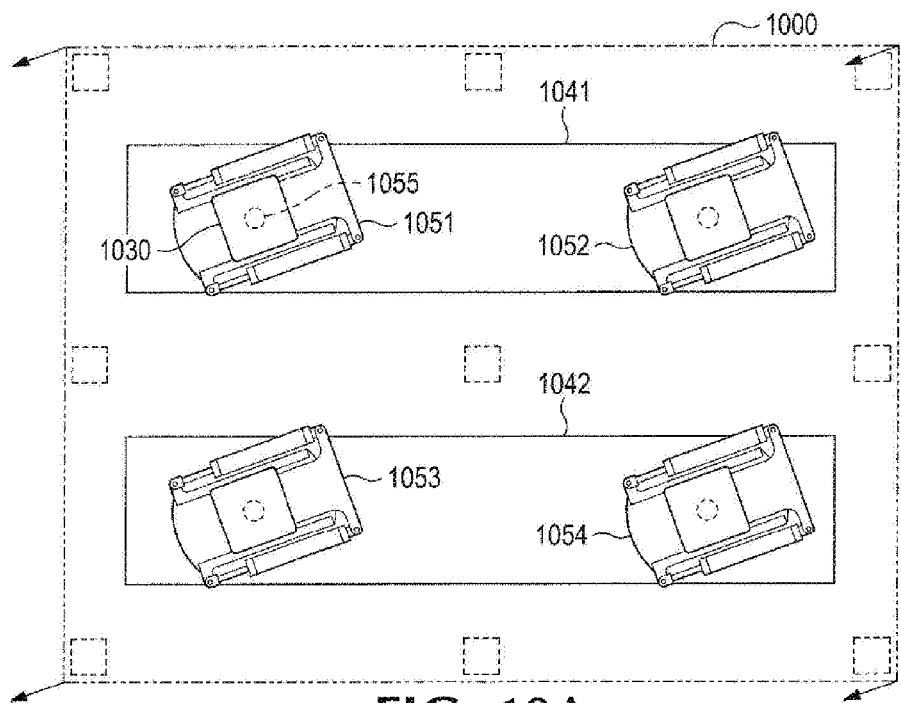
FIG. 10A is a plan view of the walking apparatuses shown in FIG. 9A in a crab-steering orientation according to embodiments of the invention.
Figure 10B:
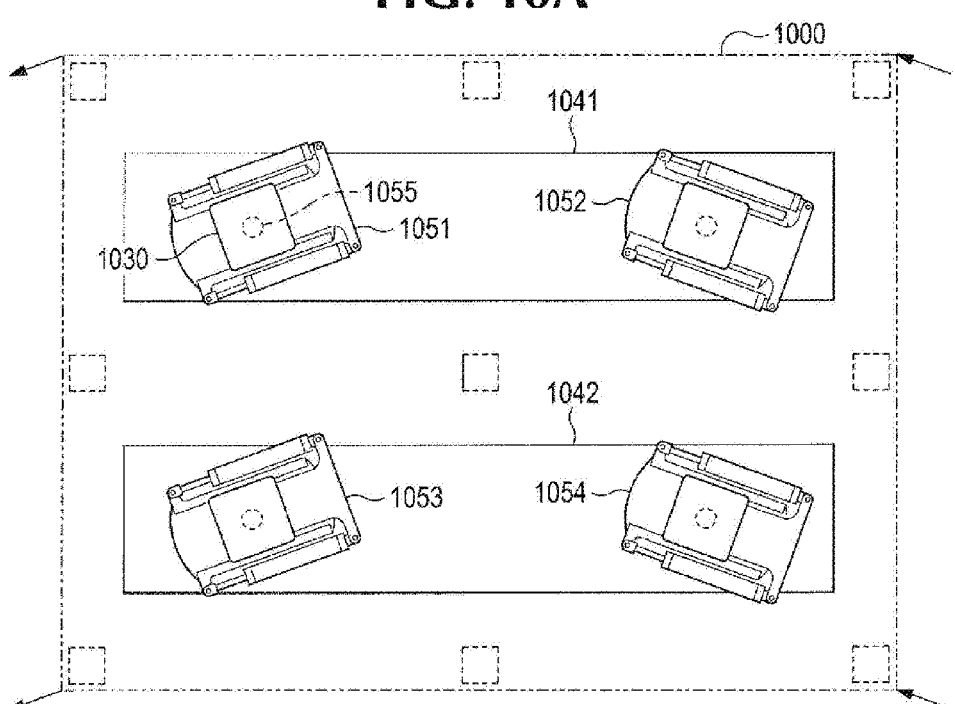
FIG. 10B is a plan view of the walking apparatuses shown in FIG. 9A in a complimentary-steering orientation according to embodiments of the invention.
Figure 10C:
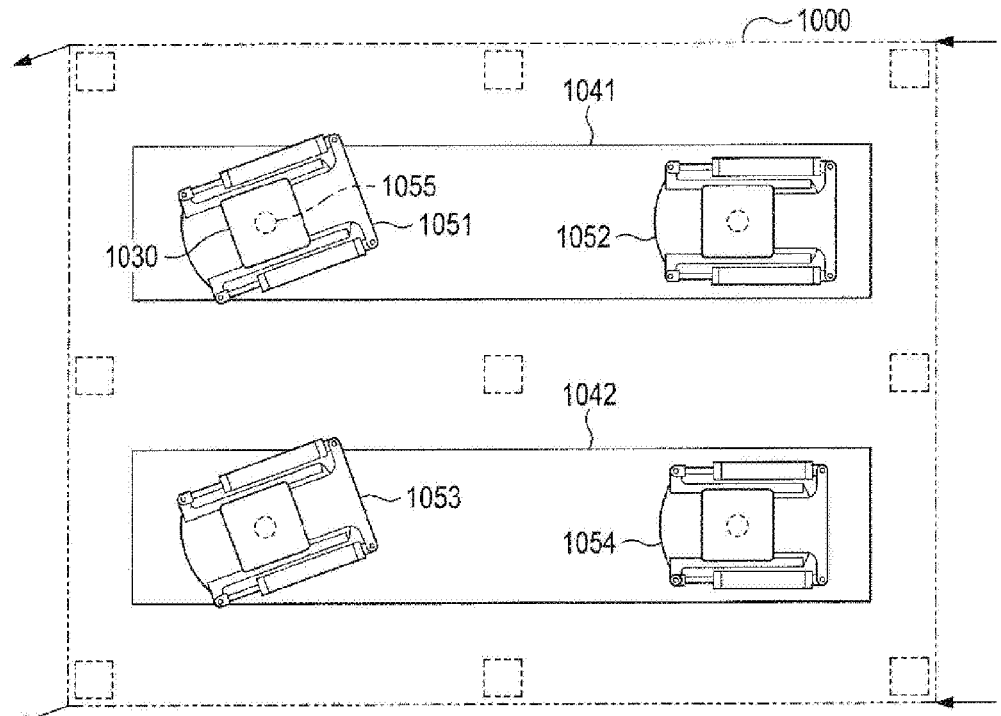
FIG. 10C is a plan view of the walking apparatuses shown in FIG. 9A in a simple-steering orientation according to embodiments of the invention.
Figure 10D:
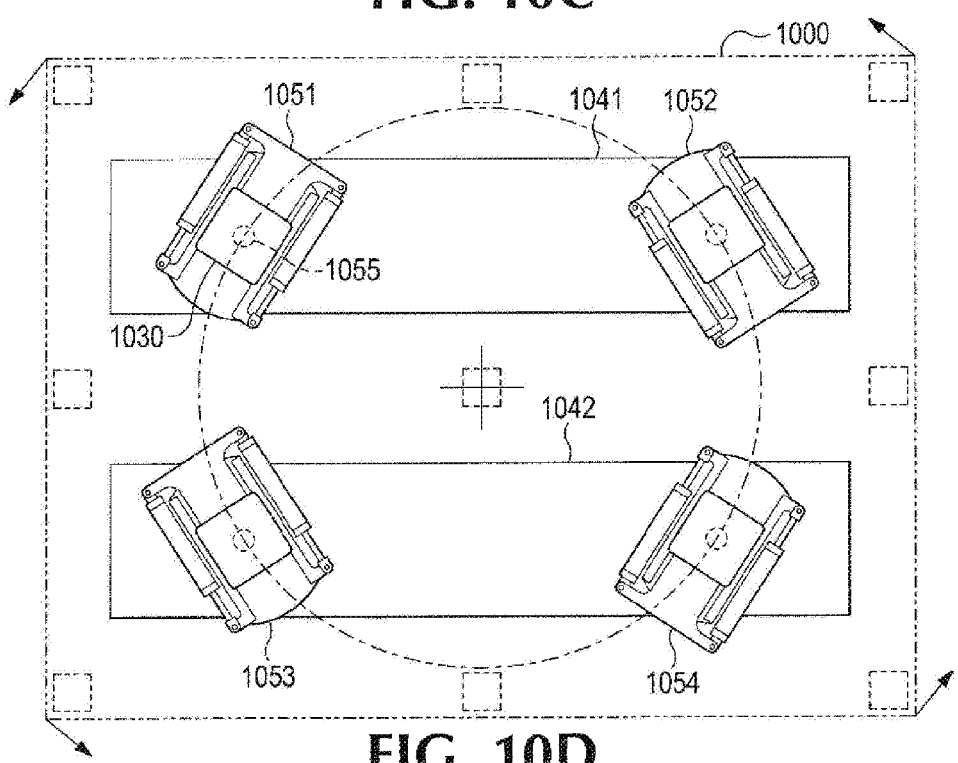
FIG. 10D is a plan view of the walking apparatuses shown in FIG. 9A in a spin-steering orientation according to embodiments of the invention.
Figure 10E:
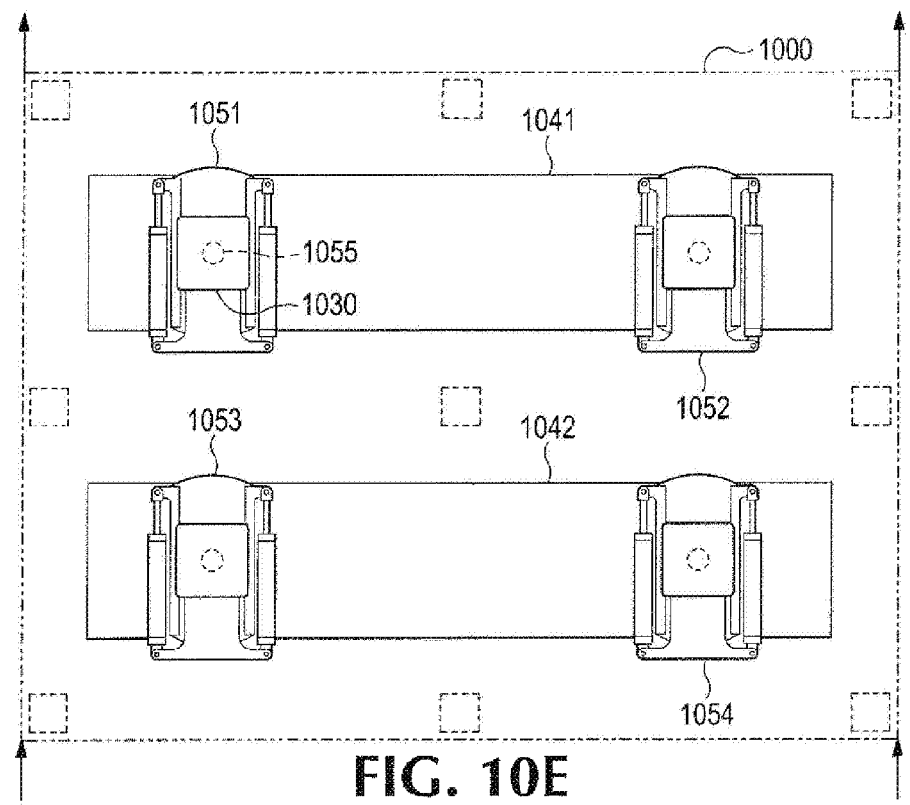
FIG. 10E is a plan view of the walking apparatuses shown in FIG. 9A in a perpendicular-steering orientation according to embodiments of the invention

FIG. 10A is a plan view of the walking apparatuses shown in FIG. 9A in a crab-steering orientation according to embodiments of the invention. FIG. 10B is a plan view of the walking apparatuses shown in FIG. 9A in a complimentary-steering orientation according to embodiments of the invention. FIG. 10C is a plan view of the walking apparatuses shown in FIG. 9A in a simple-steering orientation according to embodiments of the invention. FIG. 10D is a plan view of the walking apparatuses shown in FIG. 9A in a spin-steering orientation according to embodiments of the invention. FIG. 10E is a plan view of the walking apparatuses shown in FIG. 9A in a perpendicular-steering orientation according to embodiments of the invention.

Referring to FIG. 10A, a load 1000 connected to lift mechanisms 920 (FIG. 9B) of multiple load transporting apparatuses 1051, 1052, 1053, 1054 can be steered by rotating roller tracks and roller assemblies 1030 to a direction of travel even though support feet 1041, 1042 are not moved so as to be oriented in the same direction of travel. As shown in FIG. 10A, orienting the walking machines 1051, 1052, 1053, 1054 in diagonal directions relative to the orientation of the support feet 1041, 1042 allows for the load 1000 to be moved at a diagonal.

Referring to FIG. 10B, orienting the left two (or more) walking machines 1051, 1053 in a first direction and orienting the right two (or more) walking machines 1052, 1054 in a second complementary direction, allows the load 1000 to be moved and steered in a complimentary-steering mode.

Referring to FIG. 10C, orienting the left two (or more) walking machines 1051, 1053 in a first direction and orienting the right two (or more) walking machines 1052, 1054 in a second orthogonal direction, allows the load 1000 to be moved and steered in a simple-steering mode.

Referring to FIG. 10D, orienting first diagonally opposite walking machines 1051, 1054 in a first direction and orienting second diagonally opposite walking machines 1052, 1053 in a second direction, allows the load 1000 to be moved and steered in a spin-steering mode.

Referring to FIG. 10E, orienting the walking machines 1051, 1052, 1053, and 1054 in a direction perpendicular to the orientation of the support feet 1041, 1042 allows the load 1000 to be moved in a vertical or perpendicular direction relative to the orientation of the support feet.

These and other steering modes may be possible in part because each of the walking machines 1051, 1052, 1053, 1054 include rotation pins 1055 that allows them to be oriented in different directions from the orientation of the support feet 1041, 1042. This can be useful, for example where the support feet 1041, 1042 have a length dimension greater than the distance between support beam elements of the load-bearing frame. That is, the support feet themselves could not be rotated to a desired direction of travel because they would contact the support frame beams when trying to rotate them to a direction of travel.

Figure 11:
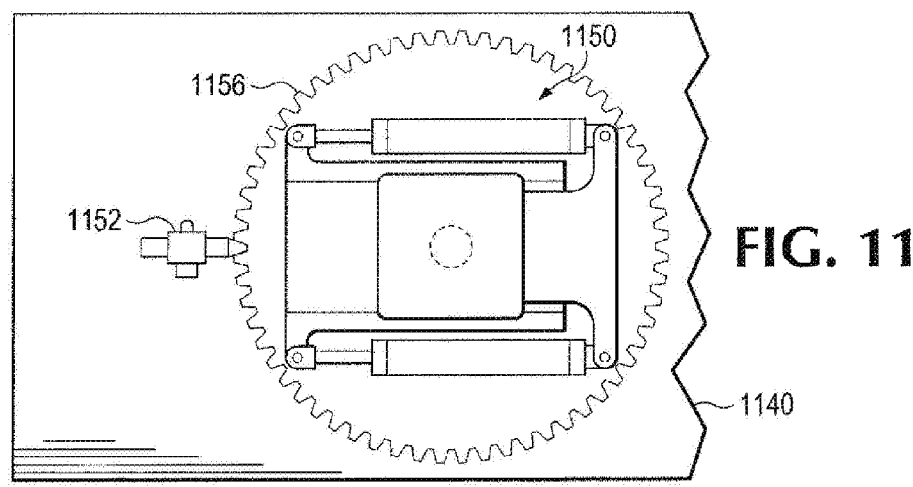
FIG. 11 is a detail diagram of a roller track configuration in a walking apparatus according to embodiments of the invention.

FIG. 11 is a detail diagram of a roller track configuration in a walking apparatus according to embodiments of the invention. Referring to FIG. 11, a roller track 1150 is positioned over a support foot 1140 and connected to the support foot with a pin connector 655 (FIG. 6). As shown in this embodiment, the roller track 1150 has a substantially circular footprint over the support foot 1140. This substantially circular footprint may allow uniform rotation of the roller track 1150 relative to the support foot 1140. Further, in some embodiments, the roller track 1150 may include a plurality of gear teeth 1156 along a bottom edge of the roller track. In these embodiments, the walking device may also include a locking device (or steering dog) 1152 that is structured to fix the position of the roller track 1150 relative to the support foot 1140. Fixing the position of the roller track 1150 relative to the support foot 1140 can be beneficial so that the alignment of the roller track relative to the support foot does not become skewed during multiple steps made by the walking device. Additionally, being able to fix the roller track 1150 relative to the support foot 1140 allows for precise directional-positioning of multiple walking devices to make more complicated steering movements.

Figure 12:
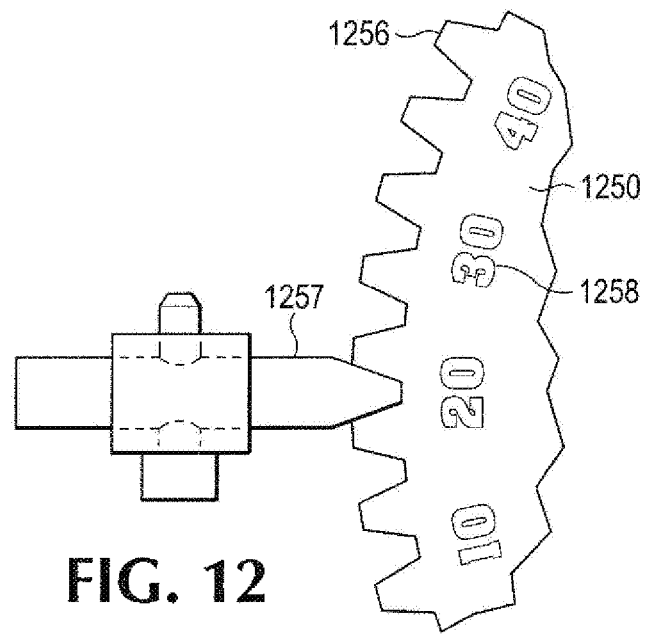
FIG. 12 is a detail diagram of an example roller track portion in a walking apparatus according to embodiments of the invention.

FIG. 12 is a detail diagram of an example roller track portion in a walking apparatus according to embodiments of the invention. Referring to FIG. 12, at least a portion of the plurality of gear teeth 1256 of the roller track 1250 are associated with indicator marks 1258. Here, the indictor marks 1258 are configured to identify the position of the roller track 1250 relative to the support foot 1150 (FIG. 11). In some embodiments, the indicator marks may include numbers, letters, or any other identifiable alpha-numeric symbols. In other embodiments, the indicator marks 1258 may include a dot, pit, bump, or other mark that can be counted. In some embodiments, the indicator marks 1258 may be associated with each position between gear teeth 1256, while in other embodiments, the indicator marks may appear only by every fifth gear tooth, or some other interval between gear teeth. As shown in FIG. 12, and steering dog or position lock 1257 may be used to fix the position of the roller track 1250 relative to the support foot. In some embodiments, all roller tracks 1250 of all walking machines used on job may be oriented in common manner at setup so that any steering movements needed during transport of the load can utilize common indicator values so that the roller tracks can be correctly positioned quickly.

Figure 13:
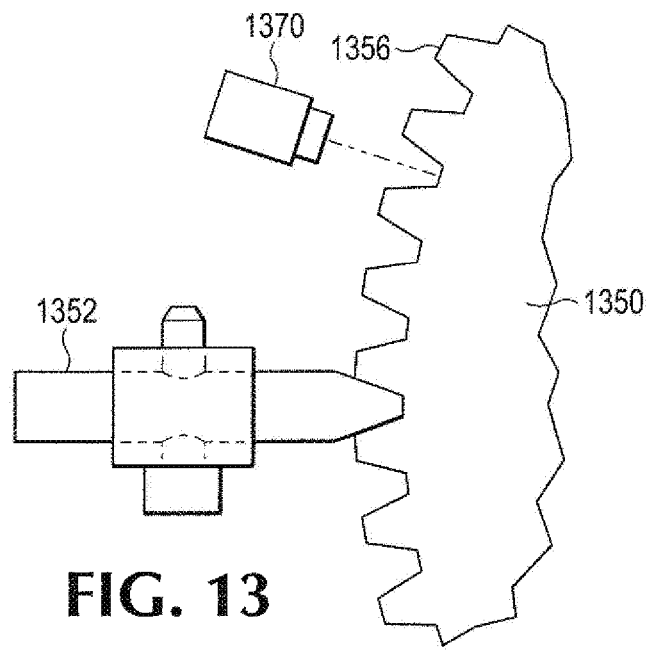
FIG. 13 is a detail diagram of another example roller track portion in a walking apparatus according to embodiments of the invention.

FIG. 13 is a detail diagram of another example roller track portion in a walking apparatus according to embodiments of the invention. Referring to FIG. 13, a walking apparatus may also include a position feedback sensor 1370 that is configured to detect the position of the roller track 1350 relative to the support foot. Here, the position feedback sensor 1370 may detect an actual position of the roller track 1350 or gears 1356, or may be used to detect relative movement between two positions (i.e., count the gears 1356 between a rotational movement of the roller track 1350). Again a locking mechanism 1352 may be used to lock the roller 1350 in place relative to the support foot.

The walking apparatuses can use a variety of ways to have the roller track moved relative to the support foot in order to steer the movement of a load. In some embodiments, an operator can manually move the roller track relative to the support foot to perform a steering movement. However, because of the size and weights involved with a typical application, some embodiments of the walking apparatus utilize a movement device that is configured to move the roller track relative to the support foot.

Figure 14:
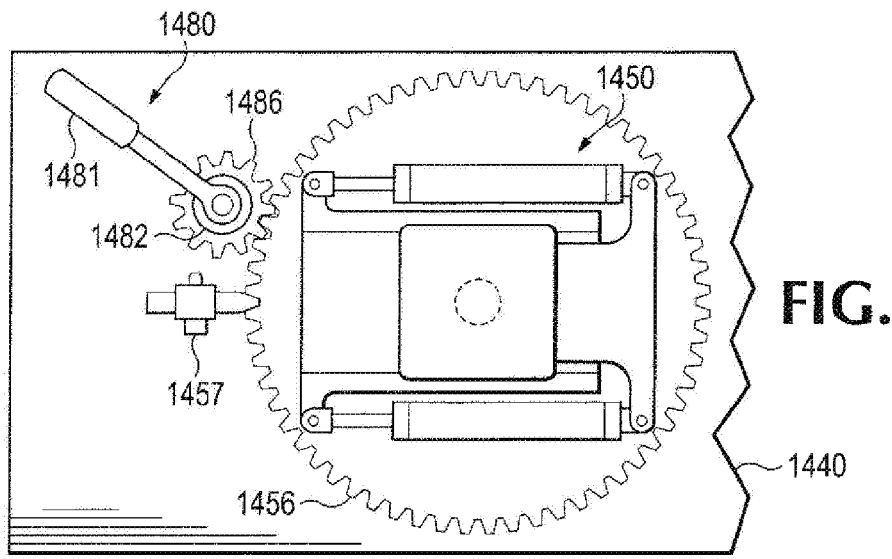
FIG. 14 is a detail diagram of a rotation device for use with a roller track in a walking apparatus according to embodiments of the invention.

FIG. 14 is a detail diagram of a rotation device for use with a roller track in a walking apparatus according to various embodiments. Referring to FIG. 14, a walking apparatus includes a steering mechanism 1480 to rotate a roller track 1450 relative to a support foot 1440. The steering mechanism 1480 may include a rotatable gear 1486 configured to interface with the gear teeth 1456 along the bottom edge of the roller track 1450. The steering mechanism 1480 may also include an elongated handle 1481 so that an operator can turn the rotatable gear 1486 with relative ease. Additionally, in some embodiments, the steering mechanism 1480 may include a ratcheting mechanism 1482 so that a user only need operate the elongated handle 1481 over a limited distance. A locking mechanism 1457 may be used to lock the roller track 1450 in place once the desired orientation is reached.

Figure 15:
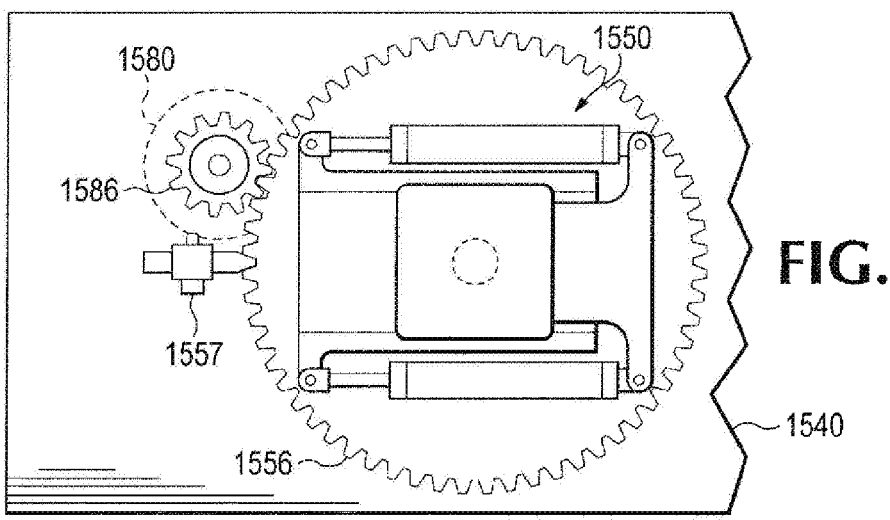
FIG. 15 is a detail diagram of another rotation device for use with a roller track in a walking apparatus according to embodiments of the invention.

FIG. 15 is a detail diagram of another rotation device for use with a roller track in a walking apparatus according to embodiments of the invention. Referring to FIG. 15, a walking apparatus includes a gear device 1580, such as a motor to rotate a roller track 1550 relative to a support foot 1540. The gear device 1580 may include a rotatable gear 1586 configured to interface with the gear teeth 1556 along the bottom edge of the roller track 1550. In some embodiments, the gear device 1580 may include a DC motor operated on batteries, or other direct current power supplies, while in other embodiments the gear device 1580 may include an AC motor operated from a generator or other types of alternating current power supplies. In other embodiments, a hydraulic motor or other types of electro/mechanical assistance devices may be used as the gear device 1580. An operator may be able to set a specific distance of travel for the motor (e.g., such as in embodiments where the motor is a stepper motor). Alternatively, the gear device 1580 may be configured to move in more than one direction (forward and backward) so that an operator can fine-tune a position of the roller track 1550. In yet other embodiments, a position feedback sensor 1370 (FIG. 13) may be used to identify a position of the roller track 1550. Here, the operator may only have to type in an angular displacement between the roller track 1550 and the support foot 1540 and allow the motor 1580 and/or feedback sensor 1370 determine a correct position and move the roller track to that determined position. A locking mechanism 1557 may be used to lock the roller track 1550 in place once the desired orientation is reached.

Figure 16:
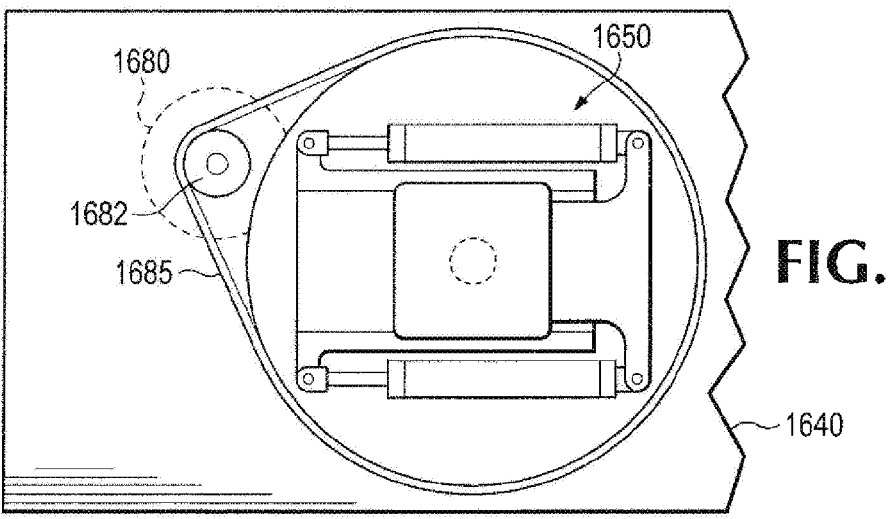
FIG. 16 is a detail diagram of another rotation device for use with a roller track in a walking apparatus according to embodiments of the invention.

FIG. 16 is a detail diagram of another rotation device for use with a roller track in a walking apparatus according to embodiments of the invention. Referring to FIG. 16, a roller track 1650 positioned on a support foot 1640 may not have gears associated with an edge portion. Here, the roller track is engaged to a drive pulley 1682 via a drive belt or chain 1685. The drive pulley 1682 may be connected to a motor 1680 or other movement devices capable of rotating the drive pulley 1682.

In other embodiments, the roller track may not be substantially circular, and may be rotated or moved in other ways. The above embodiments merely provide exemplary variations in constructing a walking device according to the concepts of this invention.

Figure 17:
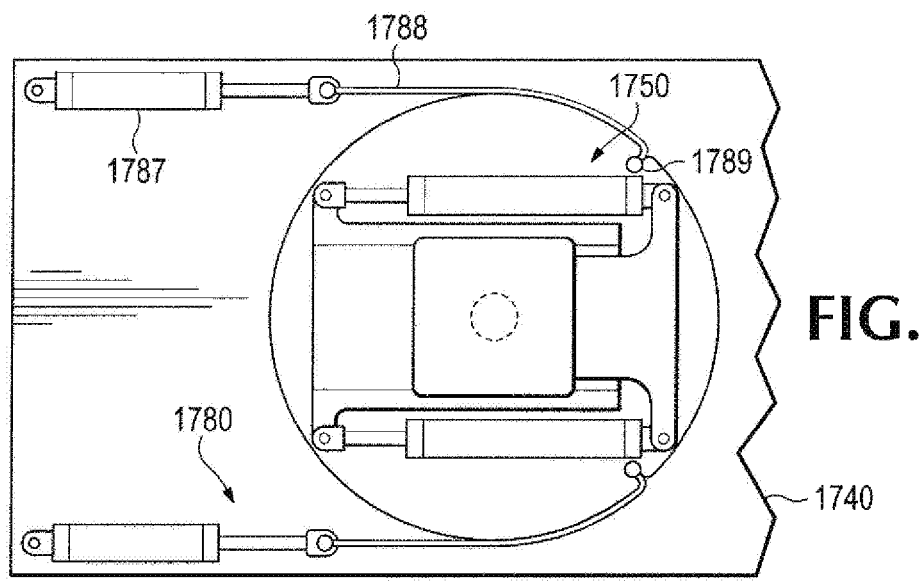
FIG. 17 is a detail diagram of another rotation device for use with a roller track in a walking apparatus according to embodiments of the invention.

FIG. 17 is a detail diagram of another rotation device for use with a roller track in a walking apparatus according to embodiments of the invention. Referring to FIG. 17, a roller track 1750 positioned on a support foot 1740 may use a cylinder propulsion system 1780 to rotate it relative to the support foot. Here, hydraulic or other cylinders 1787 are connected to attachment points 1789 on the edges of the roller track 1750 via cables 1788 or other connection devices. Depending on which cylinder 1787 is activated, the roller track 1750 will be rotated relative to the support foot 1740.

Figure 18:
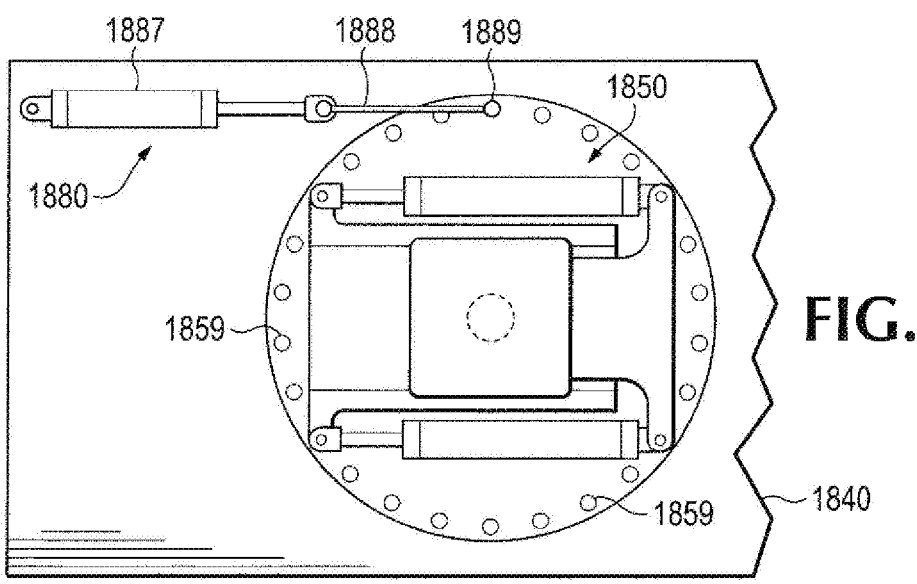
FIG. 18 is a detail diagram of another rotation device for use with a roller track in a walking apparatus according to embodiments of the invention.

FIG. 18 is a detail diagram of another rotation device for use with a roller track in a walking apparatus according to embodiments of the invention. Referring to FIG. 18, a roller track 1850 positioned on a support foot 1840 may use another type of cylinder propulsion system 1880 to rotate it relative to the support foot. Here, hydraulic or other cylinder 1887 is connected to one of multiple attachment points 1859 on the edges of the roller track 1850 via a cable or other type of link 1888 and pin connector 1889. In other embodiments, the cylinder 1887 may be directly connected to the pin connector 1889 to facilitate rotation of the roller track 1850 with respect to the support foot 1840. Here, the pin 1889 can be moved to a different attachment location 1859 and the cylinder activated to rotate the roller track 1850 in a desired direction relative to the support foot 1840.

In addition to being able to steer a load using the walking devices, use of pin connector can allow the orientation of a support foot to be maintained at a desired orientation during a movement cycle. Below are a few of the many example ways that the foot can be maintained in a desired orientation.

Figure 19:
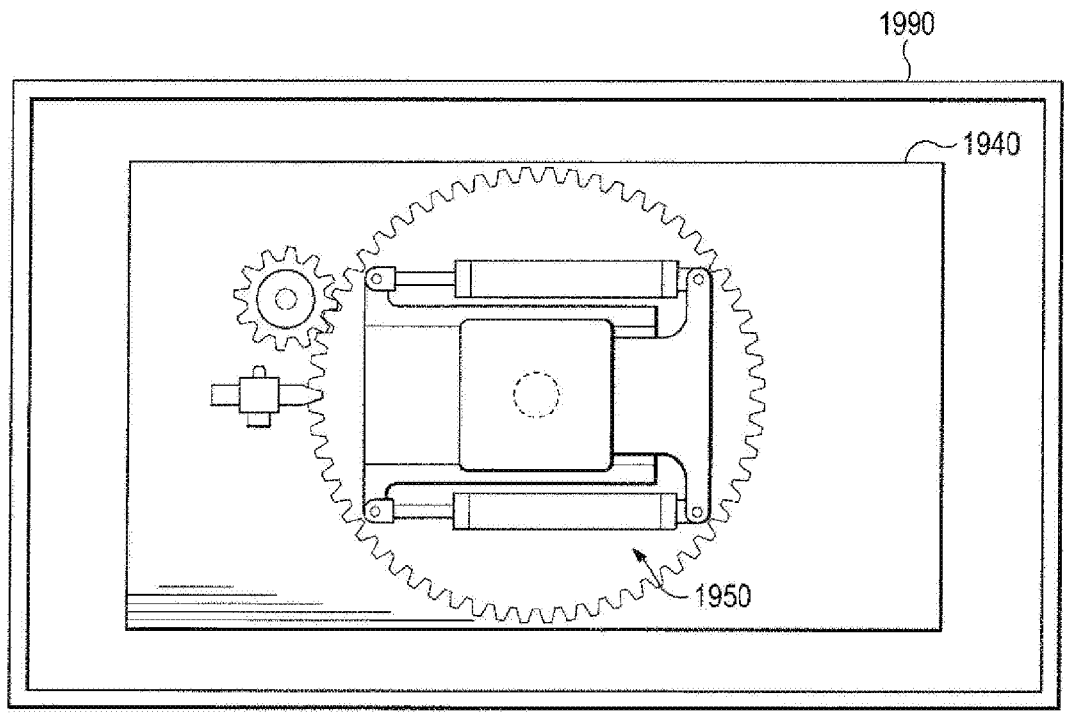
FIG. 19 is a detail diagram of an orientation device for use with a roller track in a walking apparatus according to embodiments of the invention.

FIG. 19 is a detail diagram of an orientation device for use with a roller track in a walking apparatus according to embodiments of the invention. Referring to FIG. 19, during movement of the walking device about the roller track 1950, a load can become offset from an orientation of the support foot 1940. In FIG. 19, a correction box frame 1990 is used to realign the support foot 1940 after a non-linear movement of the walking device. Here, as the edge of the support foot 1940 contacts the box frame 1990 it is pushed into orthogonal alignment with the box based on its offset edge creating a torsional moment about the pin connector 655 (FIG. 6) and rotating the support foot 1940 back into alignment.

Figure 20:
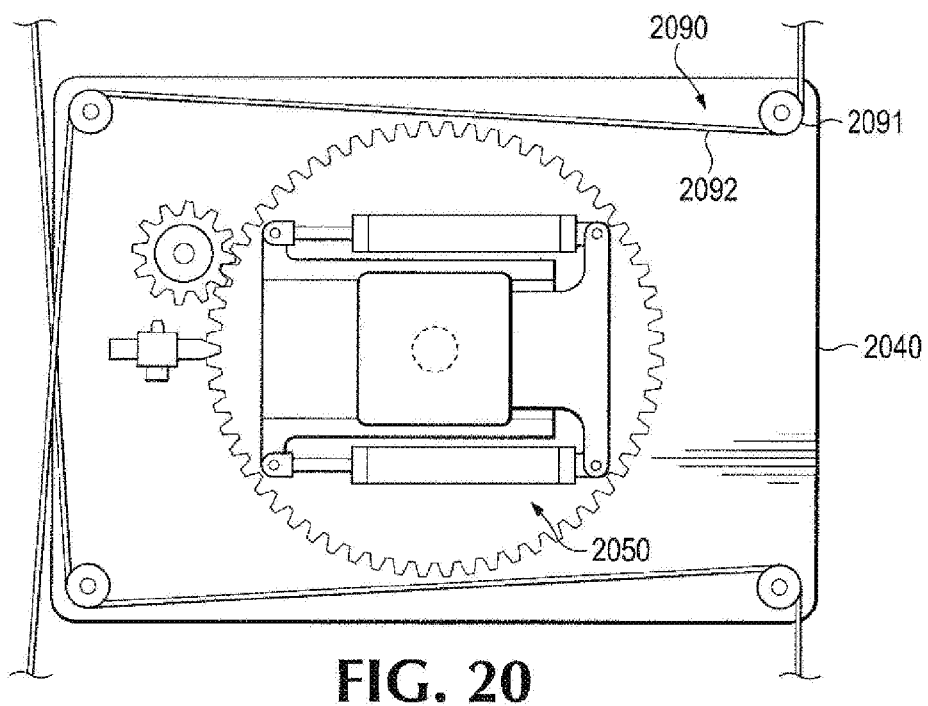
FIG. 20 is a detail diagram of another orientation device for use with a roller track in a walking apparatus according to embodiments of the invention.

FIG. 20 is a detail diagram of another orientation device for use with a roller track in a walking apparatus according to embodiments of the invention. Referring to FIG. 20, a support foot 2040 is brought back into alignment after a movement cycle by a cable tensioning system 2090 that uses cables 2092 and pulleys 2091 attached to a frame (not shown) that creates the tension needed during a move that when the support foot 2040 is raised above the ground, the support foot will be pulled back into alignment with the load. As the support foot 2040 is connected to the roller track 2050 via a pin connector 655, it does not need to rotate with the roller track.

Figure 21:
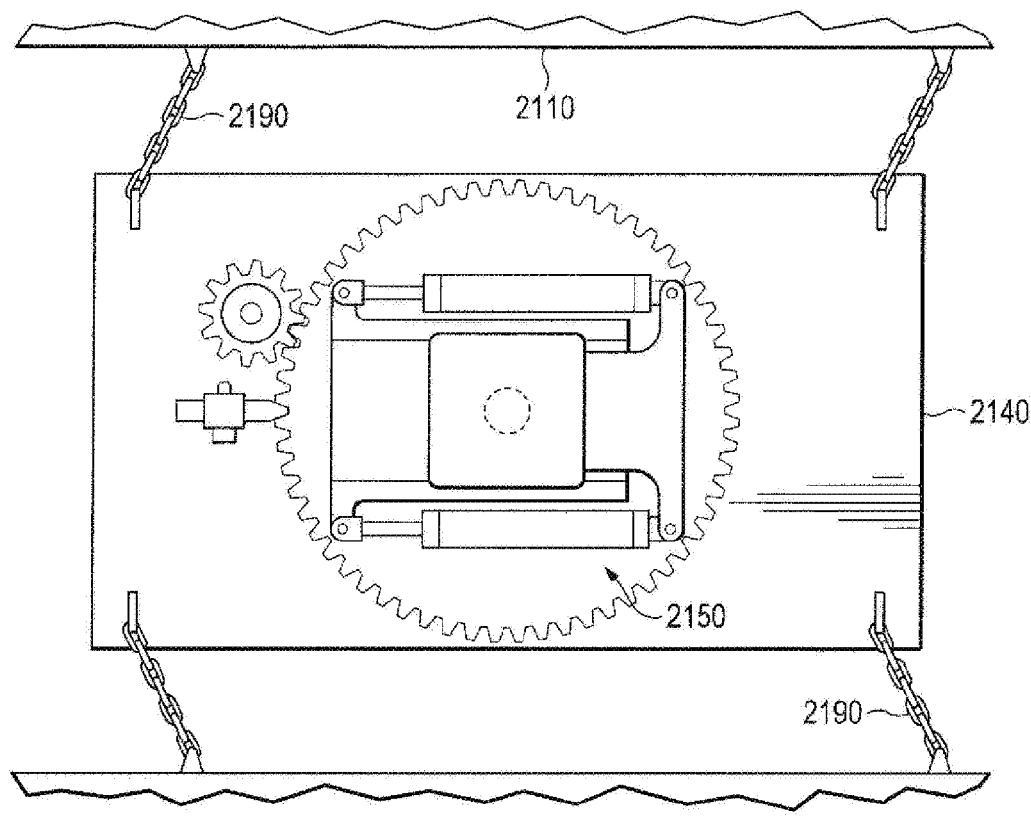
FIG. 21 is a detail diagram of another orientation device for use with a roller track in a walking apparatus according to embodiments of the invention.

FIG. 21 is a detail diagram of another orientation device for use with a roller track in a walking apparatus according to embodiments of the invention. Referring to FIG. 21, another embodiment of reorienting the support foot 2140 is shown. In this embodiment chains or other restricting mechanisms 2190 are used to create unbalanced forces when the support foot is misaligned with the frame 2110 of a load. Again, as the support foot 2140 is connected to the roller track 2150 via a pin connector, it does not need to rotate with the roller track.

Figure 22:
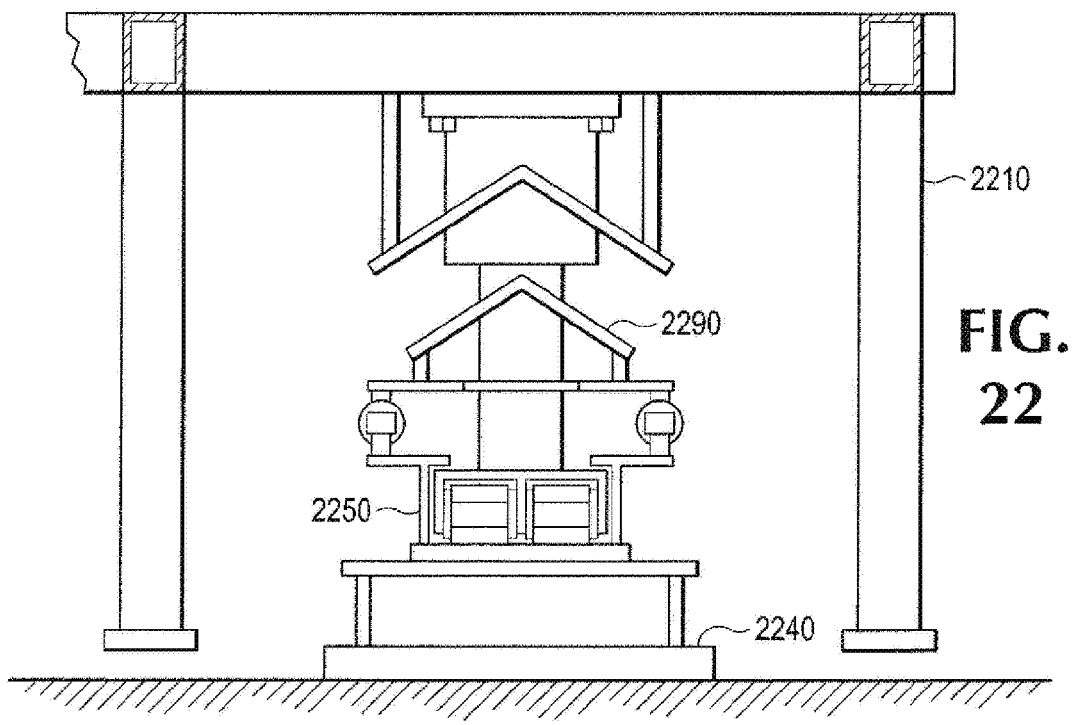
FIG. 22 is a detail diagram of another orientation device for use with a roller track in a walking apparatus according to embodiments of the invention.

FIG. 22 is a detail diagram of another orientation device for use with a roller track in a walking apparatus according to embodiments of the invention. Referring to FIG. 22, another alignment embodiment is shown. Here, the support foot 2240 can be realigned with a frame 2210 using an angle guide 2290 attached above a roller track 2250. When the support foot 2240 becomes misaligned during a movement cycle, and the support foot is lifted above the ground, the angle guide 2290 will push the support foot back into alignment.

Figure 23:
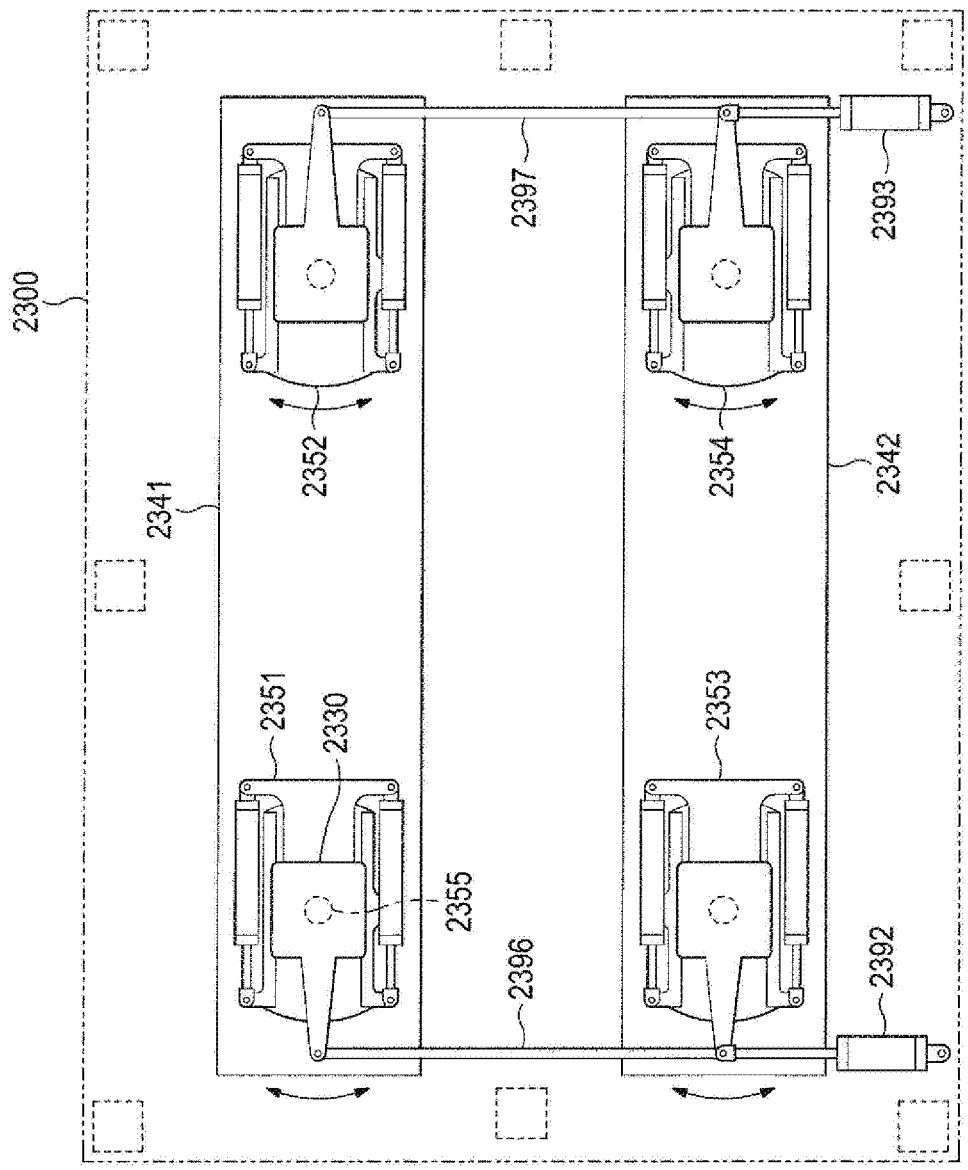
FIG. 23 is a detail diagram of a linking system used to steer roller tracks of multiple walking apparatus according to embodiments of the invention.

FIG. 23 is a detail diagram of a linking system used to steer roller tracks of multiple walking apparatus according to embodiments of the invention. Referring to FIG. 23, a linking system is used to steer multiple walking devices together in transporting a load 2300. Here, the linking system includes a cylinder (hydraulic or otherwise) 2392 and 2393 connected to two or more walking machines 2351, 2353 and 2352, 2354, respectively, via connecting rods 2396 and 2397, respectively. Here, the cylinders 2392, 2393 can be activated to rotate the connected ones of the walking machines 2351, 2352, 2353 and 2354 in a desired direction about a rotation pin 2355. Although multiple walking devices are positioned on common support feet 2341, 2342 in this embodiment, the walking devices on each common support foot do not necessarily have to be connected to the same connecting rod 2396, 2397. This is so more steering modes can be utilized such as spin-steering etc. where walking device connected to the same support foot can be oriented in different directions. The roller assemblies 2330 may move in a direction of travel even though support feet are not moved so as to be oriented in the direction of travel.

Figure 24:
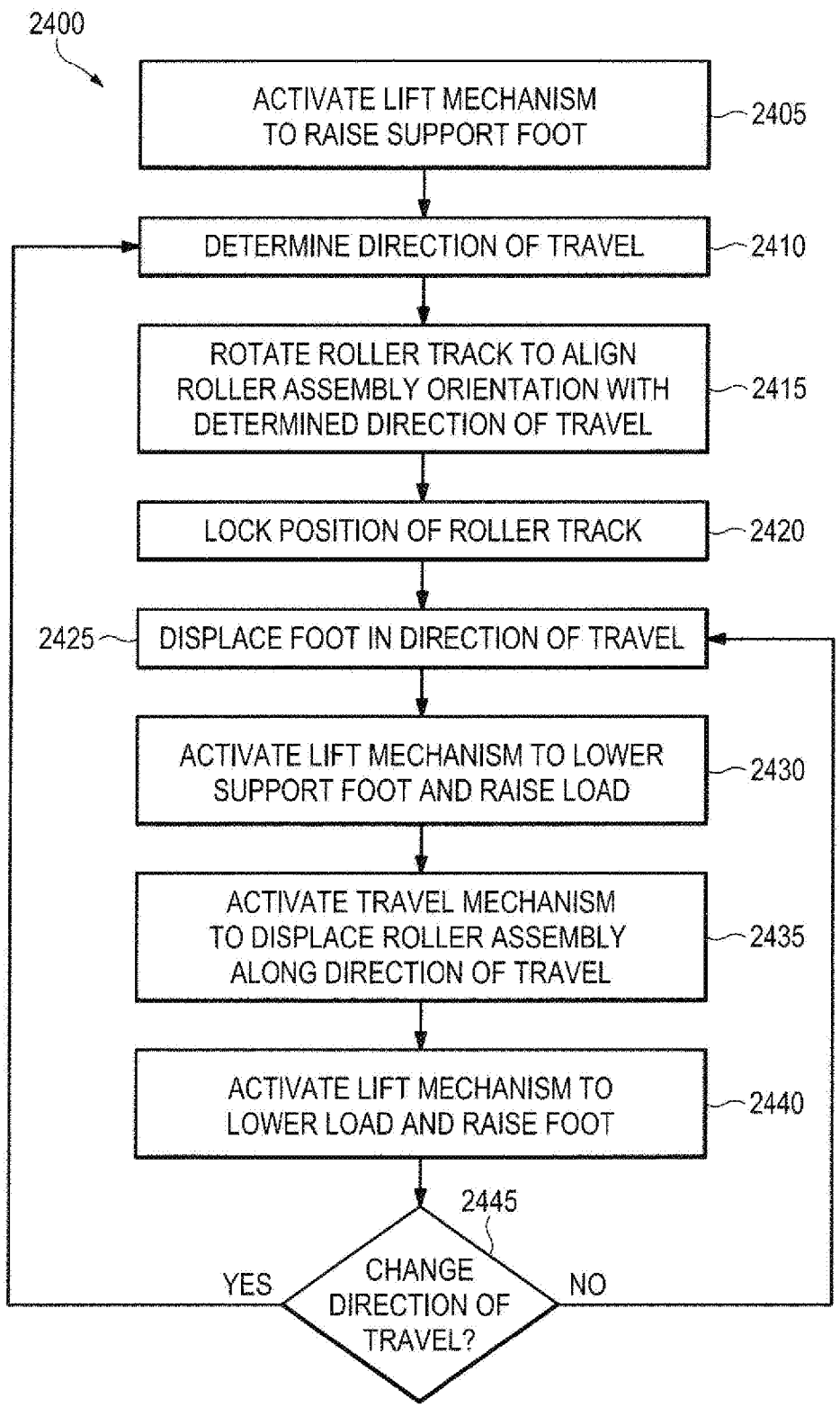
FIG. 24 is a flow diagram illustrating processes used to operate a walking apparatus according to embodiments of the invention.

FIG. 24 is a flow diagram illustrating processes used to operate a walking apparatus according to embodiments of the invention. Referring to FIG. 24, a flow 2400 begins with a first process 2405 where a lift mechanism is activated to raise the support foot. Flow 2400 then proceeds to process 2410 where a direction of travel is determined. The roller track is then rotated in process 2415 to align the roller assembly orientation with the determined direction of travel. The position of the roller track is locked in process 2420 and the foot is displaced in the direction of travel in process 2425. The lift mechanism is activated to lower the support foot and raise the load in process 2430. In process 2435 the travel mechanism is activated to displace the roller assembly along the direction of travel. The lift mechanism is activated in process 2440 to lower the load and raise the foot. It is then determined if the direction of travel needs to be changed for the next movement in process 2445. If it does not need to be changed, flow 2400 returns to process 2425 where the foot is again displaced in the direction in travel. Alternatively, when it is determined that the direction of travel does need to be changed in process 2445, flow 2400 returns to process 2410 where the new direction of travel is determined.

In another example embodiment, a method of steering a load transporting device connected to a load-bearing frame supporting a load is provided. Here, the load transporting device includes a lift mechanism structured to lift the load-bearing frame, a roller assembly coupled to the lift mechanism and configured to move over a roller track in a first direction by being manipulated by a travel mechanism, and a support foot connected to the roller track with a pin connector. The method includes activating the lift mechanism to raise the support foot off of the ground surface, determining a direction of travel of the load, and rotating the roller track relative to the support foot, where the roller track rotated to align the first direction with the direction of travel. Afterwards, the method includes locking the position of the roller track relative to the support foot, activating the lift mechanism to lower the support foot to the ground surface and raising the load supported by the frame, and activating the travel mechanism to displace the roller assembly in the first direction.

FIGS. 1-24 have illustrated the movement of the load of the walking apparatuses. By way of example, referring to FIG. 4 the movement of a load 400 along a substantially linear path from an initial position $X_1$ to a final position $X_2$. Here, that path is a horizontal path moving from left to right. This type of basis linear movement can be accomplished by a variety of walking systems. Also, FIG. 5 is a schematic diagram illustrates the movement from an initial position $X_3$ to a final position $X_4$ along a non-linear path; a reference center-point 502 of the load 500 at the initial position $X_3$ is moved to a reference center-point 592 of the load 500 at the final position $X_4$, creating a curved path of travel. Likewise other movements are: crab-steering (FIG. 10A); complimentary-steering (FIG. 10B); simple-steering (FIG. 10C); spin-steering orientation (FIG. 10D); perpendicular-steering orientation (FIG. 10E) according to embodiments of the invention. By extension, other steering modes may be possible in part because each of the walking machines 1051, 1052, 1053, 1054 include rotation pins 1055 that allows them to be oriented in different directions from the orientation of the support feet 1041, 1042.

In various embodiments, the moving components of each walking apparatus may be controlled by a controller to reduce the amount of operator interfaction with each walking apparatus.

Figure 25A:
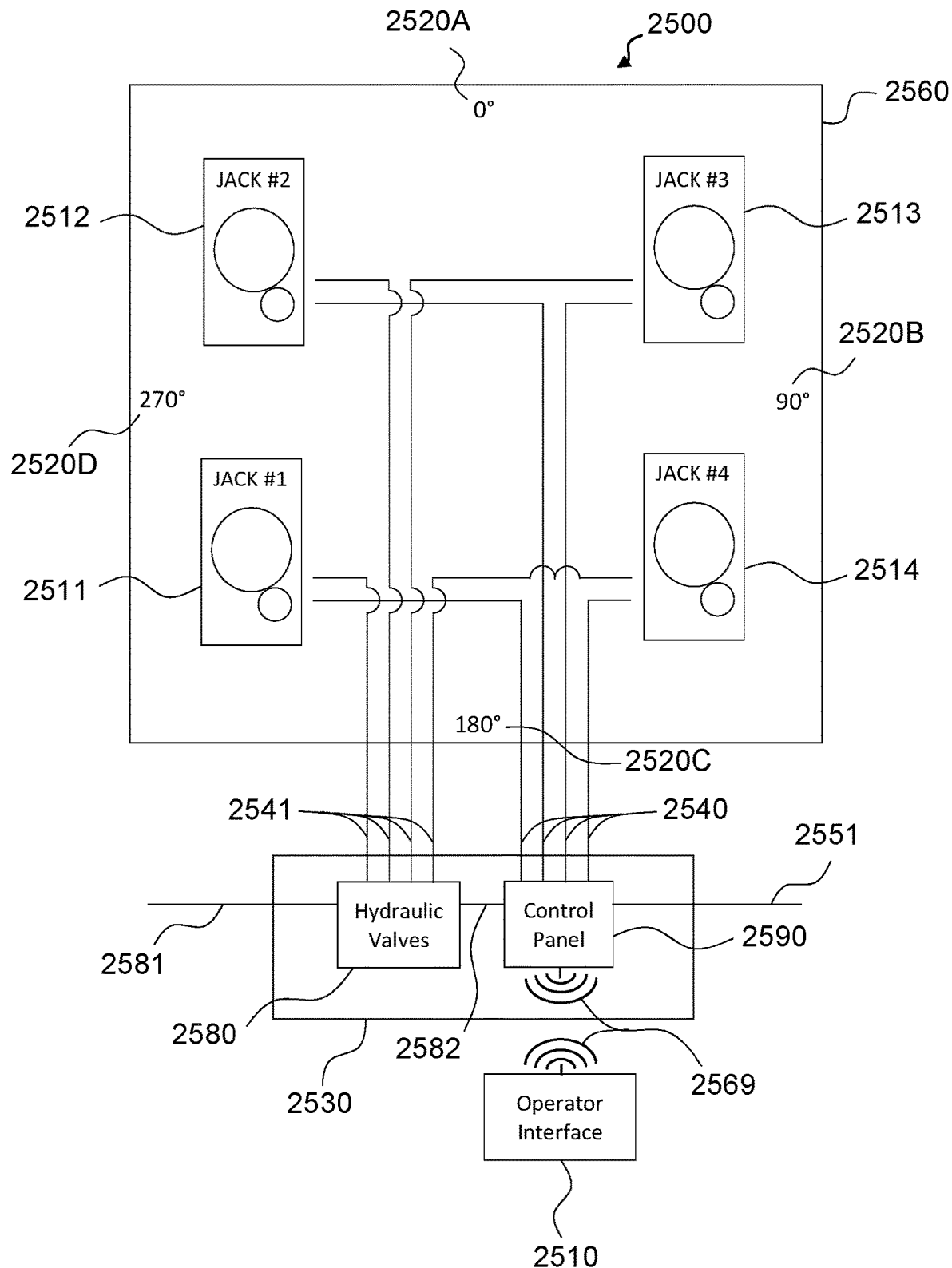
FIG. 25A is the control panel for the automated control of a walking apparatus.

FIG. 25A illustrates a system diagram 2500 of a control console 2530 configured to an operator interface 2510 and to an assemblage of walking apparatuses 2511, 2512, 2513, and 2514 supporting a load 2560. In various embodiments, the load 2560 may be supported by any number of walking apparatuses. In some embodiments, the operator interface 2510 may be physically attached to the control console 2530 and the control console 2530 may be attached to the load 2560.

The operator interface 2510 sends and receives operator interface signals 2569 to and from a control panel 2590. In one embodiment, the control panel 2590 receives electrical signals from the walking apparatuses 2511, 2512, 2513, and 2514 via position sensor signals 2540. In various embodiments, the control panel 2590 may be accompanied by multiple sub-controllers located in the proximity of some of the walking apparatuses 2511, 2512, 2513, and 2514. The sub-controllers may be configured to process signals between the control panel 2590 and the walking apparatuses 2511, 2512, 2513, and 2514.

The control panel 2590 sends signals to an assemblage of hydraulic valves 2580 via valve control signals 2582. The control panel 2590 uses the operator interface signals 2569 and the position sensor signals 2540 to determine which of the hydraulic valves 2580 to operate. Those skilled in the art will recognize that the position sensor signals 2540, operator interface signals 2569, and valve control signals 2582 may be electrical cables, interfaces on the radio frequency spectrum (e.g., Bluetooth and other forms of near field communication), a packet switched wireless connection (i.e. WiFi), and/or a packet switched optical connection either in the infrared or the visible spectrum (i.e. laser).

The hydraulic valves 2580 receive hydraulic supply and return 2581 from a hydraulic power unit. The hydraulic valves 2580 receive the valve control signals 2582 to regulate the flow of hydraulic fluid to the walking apparatuses 2511, 2512, 2513, and 2514 via hydraulic lines 2541. In various embodiments, the control console 2530 may receive power from a power cord 2551.

The system diagram 2500 includes a 0° orientation location 2520A, a 90° orientation location 2520B, a 180° orientation location 2520C, and a 270° orientation location 2520D. The orientation locations 2520A-D identify which orientation to position the operator interface 2510.

Figure 25B:
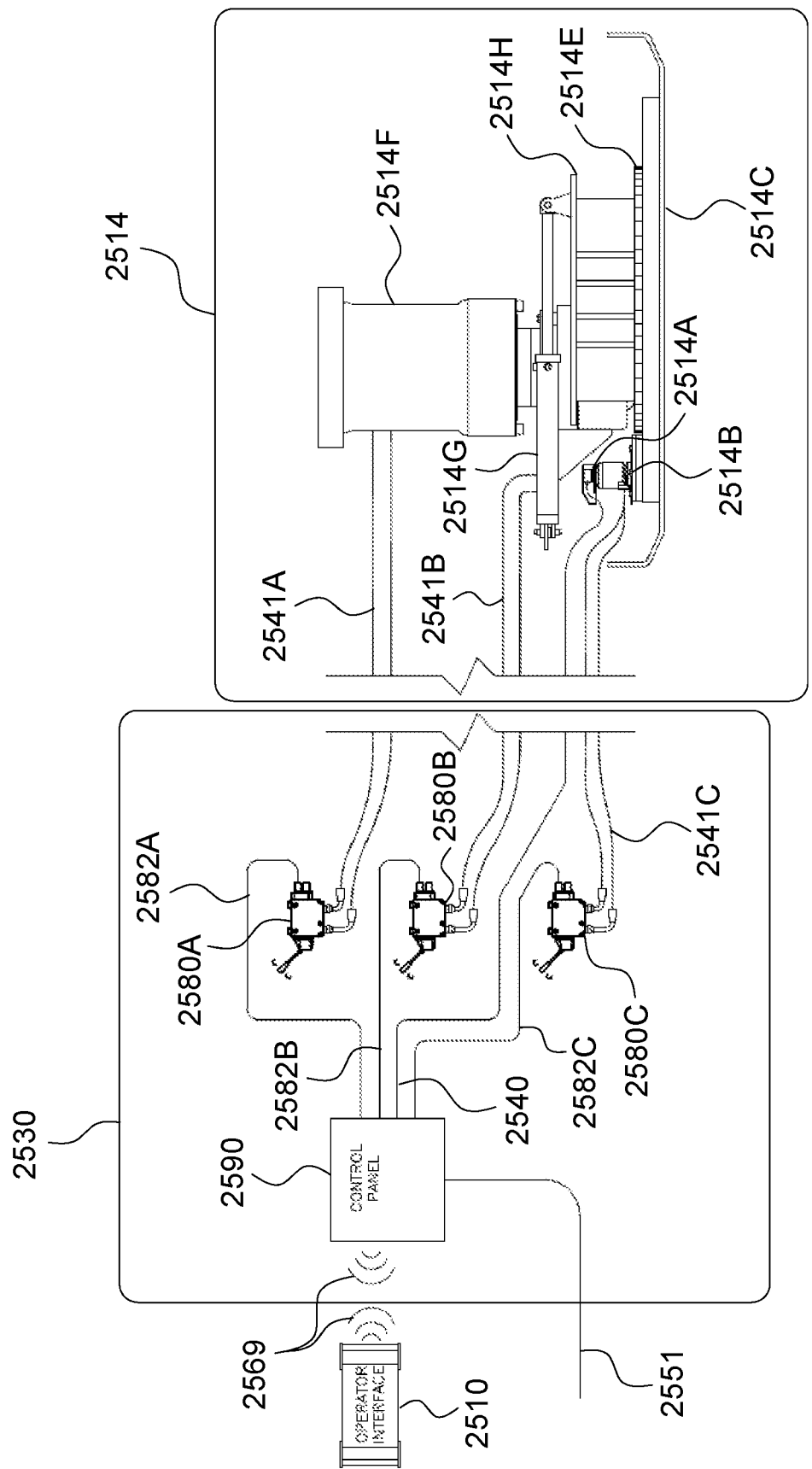
FIG. 25B is an orientation diagram for the control panel.

FIG. 25B illustrates an embodiment of the control console 2530 configured to control the walking apparatus 2514. The operator interface 2510 shares information with the control panel 2590 via operator interface signals 2569. The control panel 2590 receives position sensor signals 2540 from a steer position sensor 2514A which informs the control panel 2590 of the current position of walking apparatus 2514. In one embodiment, the steer position sensor 2514A is mechanically coupled with a steer motor 2514B. The steer motor 2514B is mechanically coupled with gear teeth 2514E on a roller track 2514H. The steer position sensor 2514A is able to sense the position of the roller track 2514H due to the mechanical connection through the gear teeth 2514E and the steer motor 2514B. In various embodiments, the steer position sensor 2514A may be mechanically, optically, hydraulically, pneumatically, electrically, or magnetically coupled with the roller track 2514H.

In various embodiments, the control panel 2590 electrically controls the position of a lift valve 2580A, a travel valve 2580B, and a steer valve 2580C via a lift valve control signal 2582A, a travel valve control signal 2582B, and a steer valve control signal 2582C, respectively. The lift valve control signal 2582A regulates the flow of hydraulic fluid in lift hydraulic lines 2541A by adjusting the position of the lift valve 2580A. The hydraulic fluid in the lift hydraulic lines 2541A extends and retracts a lift cylinder 2514F that is configured to raise and lower the load 2560 (FIG. 25A). The travel valve control signal 2582B regulates the flow of hydraulic fluid in travel hydraulic lines 2541B by adjusting the position of the travel valve 2580B. The hydraulic fluid in the travel hydraulic lines 2541B extends and retracts a travel cylinder 2514G which move a support foot 2514C substantially horizontal to the lift cylinder 2514F. The steer valve control signal 2582C regulates the flow of hydraulic fluid in steer hydraulic lines 2541C by adjusting the position of the steer valve 2580C. The hydraulic fluid in the steer hydraulic lines 2541C rotates the steer motor 2514B clockwise and counterclockwise. The steer motor 2514B is configured to rotate the orientation of the roller track 2514H relative to the support foot 2514C.

In various embodiments, the lift hydraulic lines 2541A, the travel hydraulic lines 2541B, and the steer hydraulic lines 2541C may provide hydraulic fluid to multiple other walking apparatuses. The hydraulic lines may be made of electrical cables with electrical actuators in place of the lift cylinder 2514F and the travel cylinder 2514G, and an electrical motor in place of the steer motor 2514B.

Figure 26:
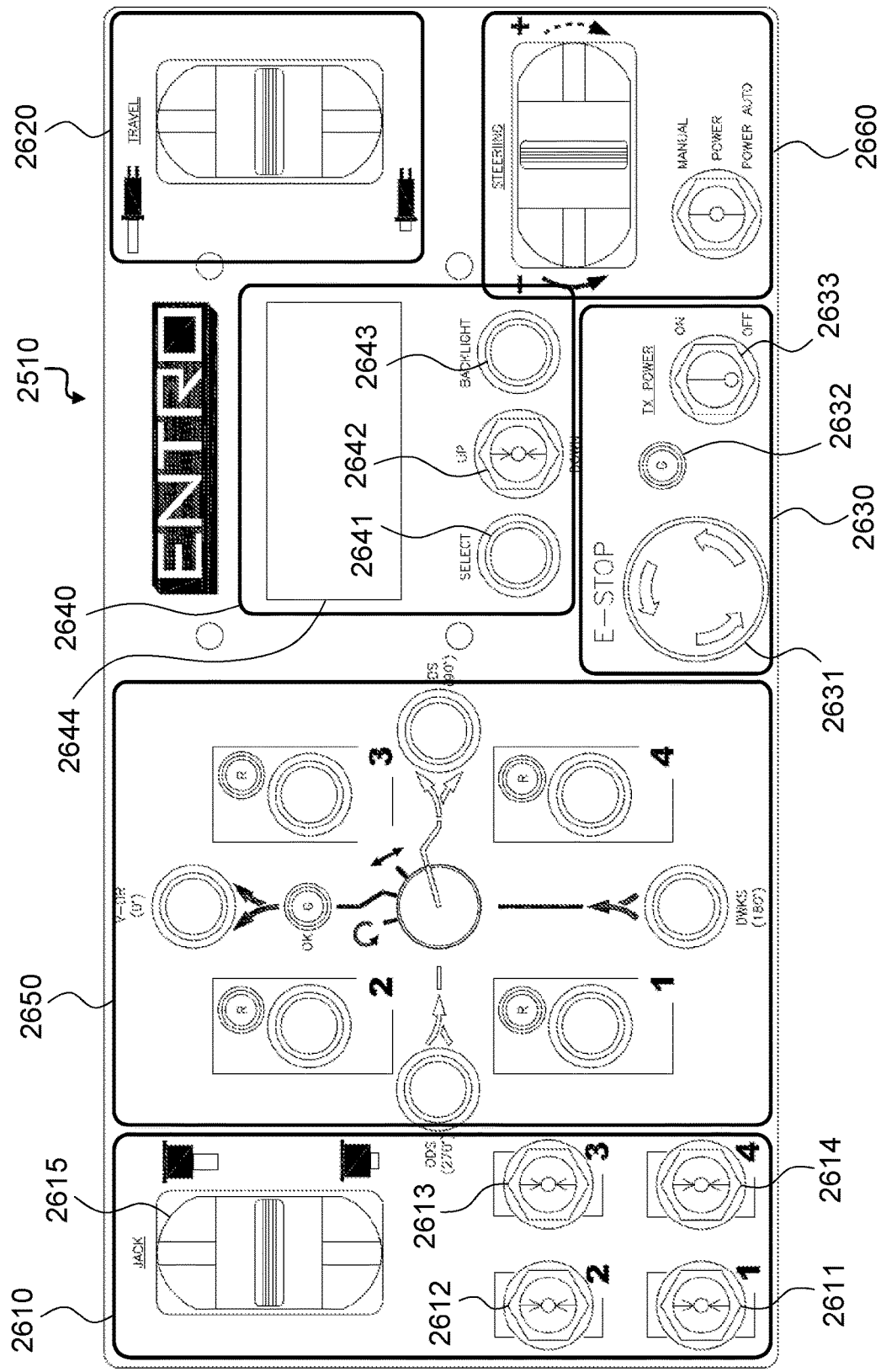
FIG. 26 depicts the schematic diagram of the control panel.

FIG. 26 illustrates the operator interface 2510 (FIG. 25A) and identifies the different areas of control. In one embodiment, the operator interface contains a multitude of buttons, paddles, toggles, a rotary dial, a display, symbols, and a graphical representation of the assemblage of walking apparatuses 2511, 2512, 2513, and 2514 (FIG. 25A). In some embodiments, the operator interface 2510 may include joysticks, tact switches, touch screens, any color of LED's, any graphical representations of the controlled walking apparatuses 2511, 2512, 2513, and 2514 (FIG. 25A) and load 2560 (FIG. 25A), and/or any control input or display device.

In one embodiment, the operator interface 2510 (FIG. 25A) includes an area of lift controls 2610 for operating the lift cylinders 2514F (FIG. 25B) for walking apparatuses 2511, 2512, 2513, and 2514 (FIG. 25A). The lift controls 2610 include an all lift control 2615 that is configured to extend and retract all lift cylinders simultaneously. The lift controls 2610 include a lift 1 control 2611, a lift 2 control 2612, a lift 3 control 2613, and a lift 4 control 2614 to independently operate lift cylinders 2514F for walking apparatuses 2511, 2512, 2513, and 2514 respectively. In various embodiments, the lift controls 2610 may include any number of independent lift controls. The independent lift controls 2611, 2612, 2613 and 2614 may control a single lift cylinder or any number of lift cylinders simultaneously.

In some embodiments, the operator interface 2510 (FIG. 25A) includes an area of travel controls 2620. The travel control 2620 is configured to operate all travel cylinders simultaneously. In some embodiments, the operator interface 2510 (FIG. 25A) may include any number of controls to operate all travel cylinders simultaneously or independently operate any number of travel cylinders at any particular time period.

In one embodiment, the operator interface 2510 (FIG. 25A) includes an area for display controls 2640 and an area of power controls 2630. The display controls include a display screen, 2644, a select button 2641, a backlight button 2643, and an up and down toggle 2642. The display screen 2644 displays information about the current status of the system as well as current input information from the operator interface 2510 (FIG. 25A). The select button 2641 and the up and down toggle 2642 adjust display information on display screen 2644. The backlight button 2643 turns on and off the backlight of the display screen 2644. Various embodiments may include a touch screen or larger screen to display more information. The power controls 2630 include an on-off toggle 2633 to turn the operator interface 2510 (FIG. 25A) on or off, a power indicator LED 2632 to inform the operator of the power status of the operator interface 2510 (FIG. 25A), and an emergency stop 2631 to quickly shut off the power to the control panel 2590 (FIG. 25A).

In one embodiment, the operator interface 2510 (FIG. 25A) includes an area of steering location controls 2650 and an area of steering input controls 2660. The steering location controls 2650 control which area of the assemblage of walking apparatuses 2511, 2512, 2513, and 2514 (FIG. 25A) receives a steering adjustment. The steering input controls 2660 control the steering adjustment.

Figure 27:
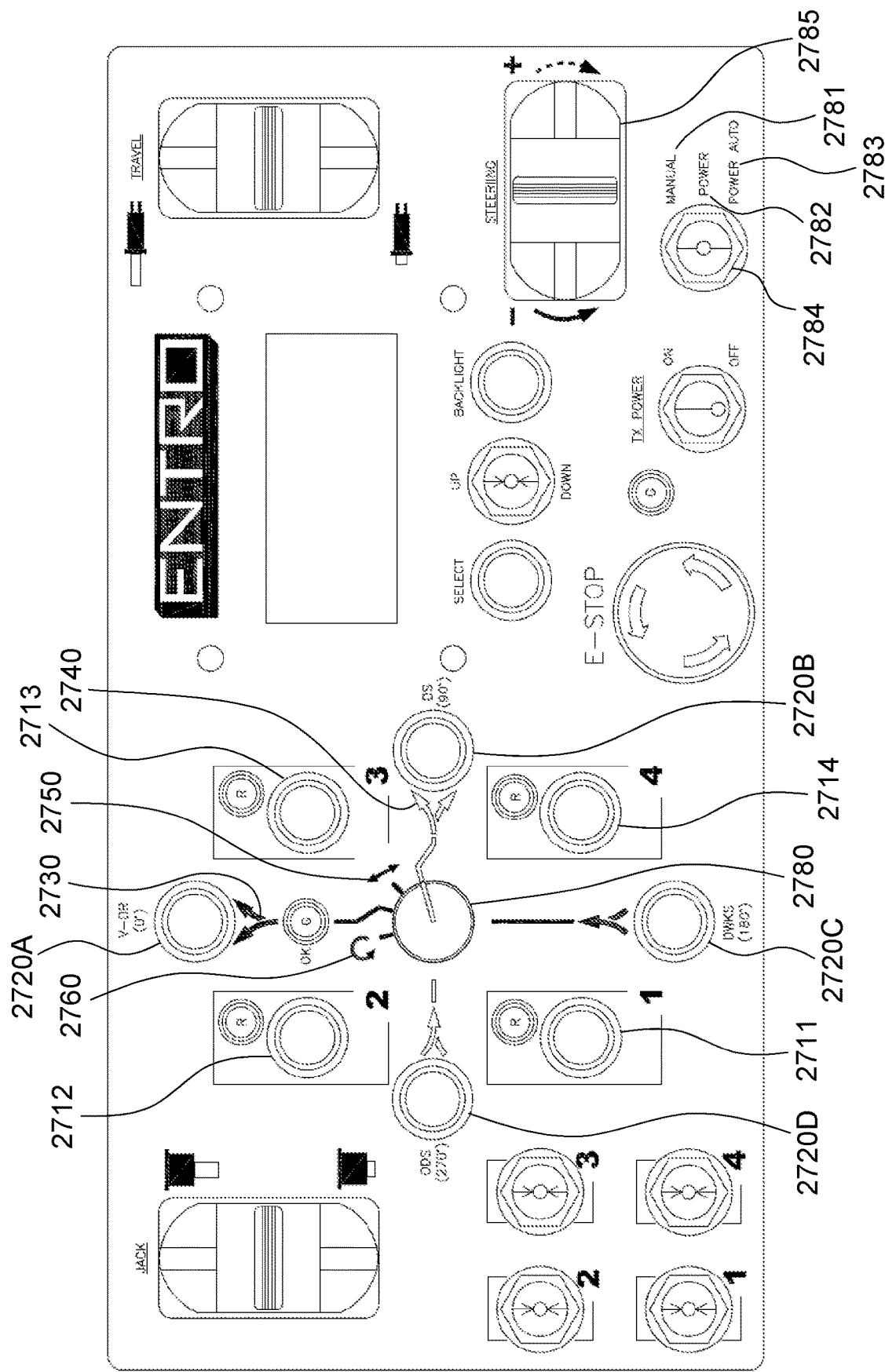
FIG. 27 depicts the operational flowchart of using the walking system control panel.

FIG. 27 illustrates the operator interface 2510 (FIG. 25A) and identifies the individual steering location controls 2650 (FIG. 26) and steering input controls 2660 (FIG. 26). The steering input controls 2660 (FIG. 26) includes a steer control toggle 2784 and a set point input paddle 2785. The steer control toggle 2784 has a manual position 2781, power position 2782, and power auto position 2783 which selects which method of steering control the control panel 2590 (FIG. 25A) performs. Regardless of the position of the steer control toggle 2784, the control panel 2590 (FIG. 25A) may create and display set points for the walking apparatuses 2511, 2512, 2513, and 2514 (FIG. 25A). When the steer control toggle 2784 is in the power auto position 2783, the control panel 2590 (FIG. 25A) may automatically adjust the hydraulic valves 2580 (FIG. 25A) until the position sensor signals 2540 (FIG. 25A) achieve their respective set points. When the steer control toggle 2784 is in the power position 2782, the control panel 2590 (FIG. 25A) may not automatically adjust the hydraulic valves 2580 (FIG. 25A) but the steer motor 2514B (FIG. 25B) may be operated to adjust the orientation of the roller track 2514H (FIG. 25B). When the steer control toggle 2784 is in the manual position 2781, the control panel 2590 (FIG. 25A) may not automatically adjust the hydraulic valves 2580 (FIG. 25A) and the operation of the steer motor 2514B (FIG. 25B) may be inhibited. When the steer control toggle 2784 is in the manual position 2781, the orientation of the roller track 2514H (FIG. 25B) may only be adjusted manually.

In one embodiment, the steering location controls 2650 (FIG. 26) include a steer location button 2711, a steer location button 2712, a steer location button 2713, and a steer location button 2714. When used in conjunction with the set point input paddle 2785, the steer location buttons 2711, 2712, 2713, and 2714 send signals to the control panel 2590 (FIG. 25A) to adjust the orientation of the walking apparatuses 2511, 2512, 2513, and 2514 (FIG. 25A) respectively. The steering location controls 2650 (FIG. 26) include a 0° orientation location button 2720A, a 90° orientation location button 2720B, a 180° orientation location button 2720C, and a 270° orientation location button 2720D. The orientation location buttons 2720A-D inform the control panel 2590 (FIG. 25A) which location relative to the assemblage of walking apparatuses 2511, 2512, 2513, and 2514 (FIG. 25A) to allow adjustment of set points by the set point input paddle 2785. In some embodiments, the steering location controls 2650 (FIG. 26) may include any number of steer location buttons 2711, 2712, 2713, and 2714 or orientation location buttons 2720A-D. The steer location buttons 2711, 2712, 2713, and 2714 or orientation location buttons 2720A-D may be tact switches, pushbuttons, toggles, levers, paddles, touch screen, any other input device, etc.

The steering location controls 2650 (FIG. 26) include a steer mode dial 2780 which informs the control panel 2590 (FIG. 25A) regarding the type of steering mode to use to determine set points for the walking apparatuses 2511, 2512, 2513, and 2514 (FIG. 25A). The steer mode dial 2780 includes a normal mode dial position 2730, a lateral mode dial position 2740, a crab mode dial position 2750, and a spin mode dial position 2760.

Figure 28:
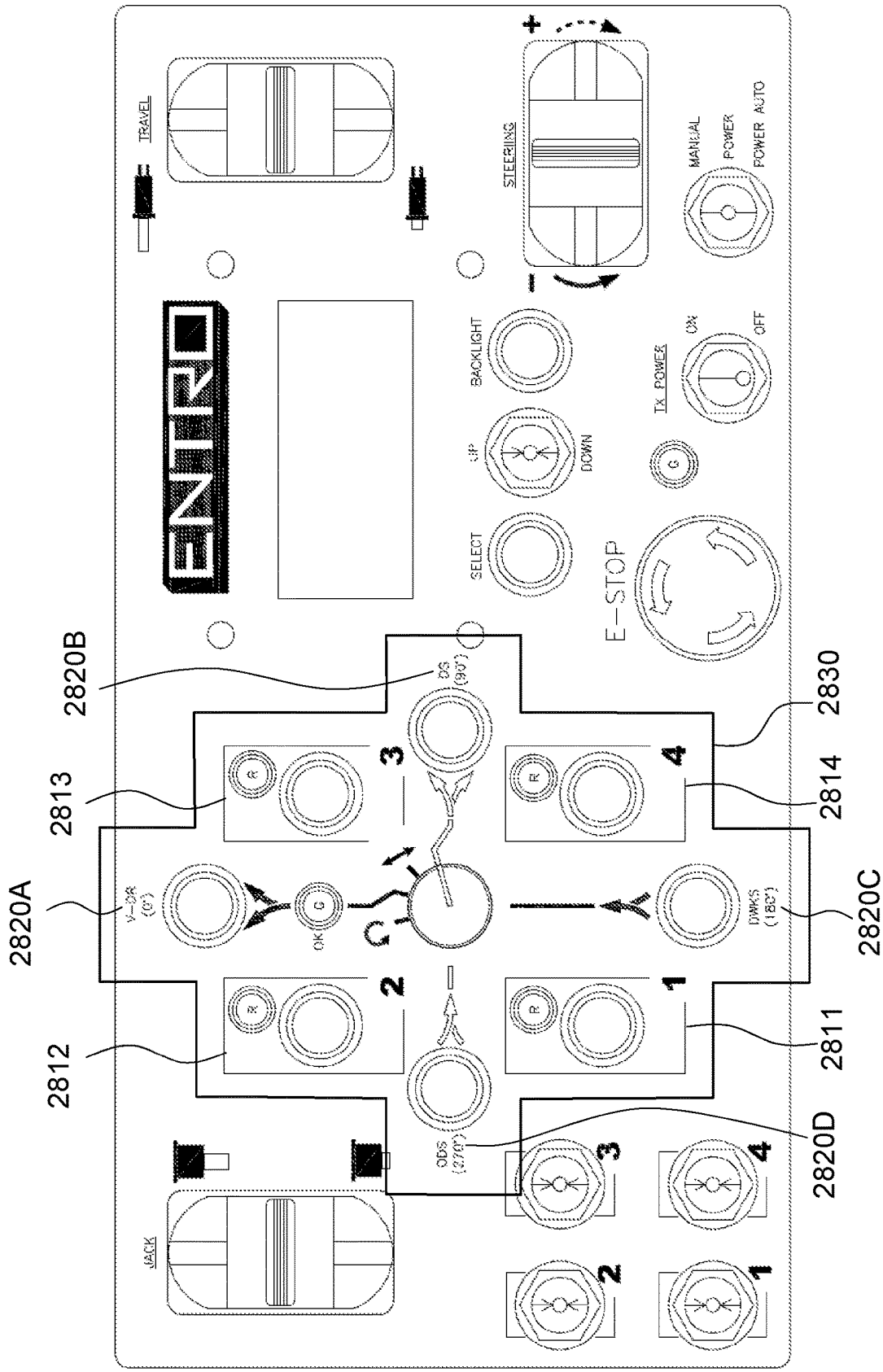
FIG. 28 depicts the schematic diagram of the control panel.

FIG. 28 illustrates the operator interface 2510 (FIG. 25A) and identifies a graphical representation 2830 of the assemblage of walking apparatuses 2511, 2512, 2513, and 2514 (FIG. 25A) and their location relative to each other. In some embodiments, the graphical representation 2830 includes a symbol of a first walking apparatus 2811, a symbol of second walking apparatus 2812, a symbol of a third walking apparatus 2813, and a symbol of a fourth walking apparatus 2814. The steer location buttons 2711, 2712, 2713, and 2714 are located within the symbol of walking apparatuses 2811, 2812, 2813, and 2814 respectively to illustrate their direct control over the individual walking apparatuses 2511, 2512, 2513, and 2514. The graphical representation 2830 includes a 0° orientation mark 2820A, a 90° orientation mark 2820B, a 180° orientation mark 2820C, and a 270° orientation mark 2820D. The orientation location buttons 2720A-D and the orientation marks 2820A-D are located within the graphical representation 2830 relative to the location within the assemblage of walking apparatuses 2511, 2512, 2513, and 2514 (FIG. 25A) to which they control. In various embodiments, the graphical representation 2830 may include any number of symbols of walking apparatuses or any number of orientation marks. The graphical representation may include symbols of walking apparatuses that contain multiple steer location selection buttons or a steer location button may exist within multiple symbols of walking apparatuses.

Now referring to FIGS. 29A-D, FIGS. 29A-D illustrate a normal steering mode schematic 2900A, a lateral steering mode schematic 2900B, a crab steering mode schematic 2900C, and a spin steering mode schematic 2900D. FIGS. 29A-D include the assemblage of walking apparatuses 2511, 2512, 2513, and 2514, the load 2560, the orientation locations 2520A-D, a first walking apparatus orientation 2911, a second walking apparatus orientation 2912, a third walking apparatus orientation 2913, and a fourth walking apparatus orientation 2914. The walking apparatus orientations 2911, 2912, 2913, and 2914 identify which direction the walking apparatuses 2511, 2512, 2513, and 2514 will move during a walking cycle.

Figure 29A:
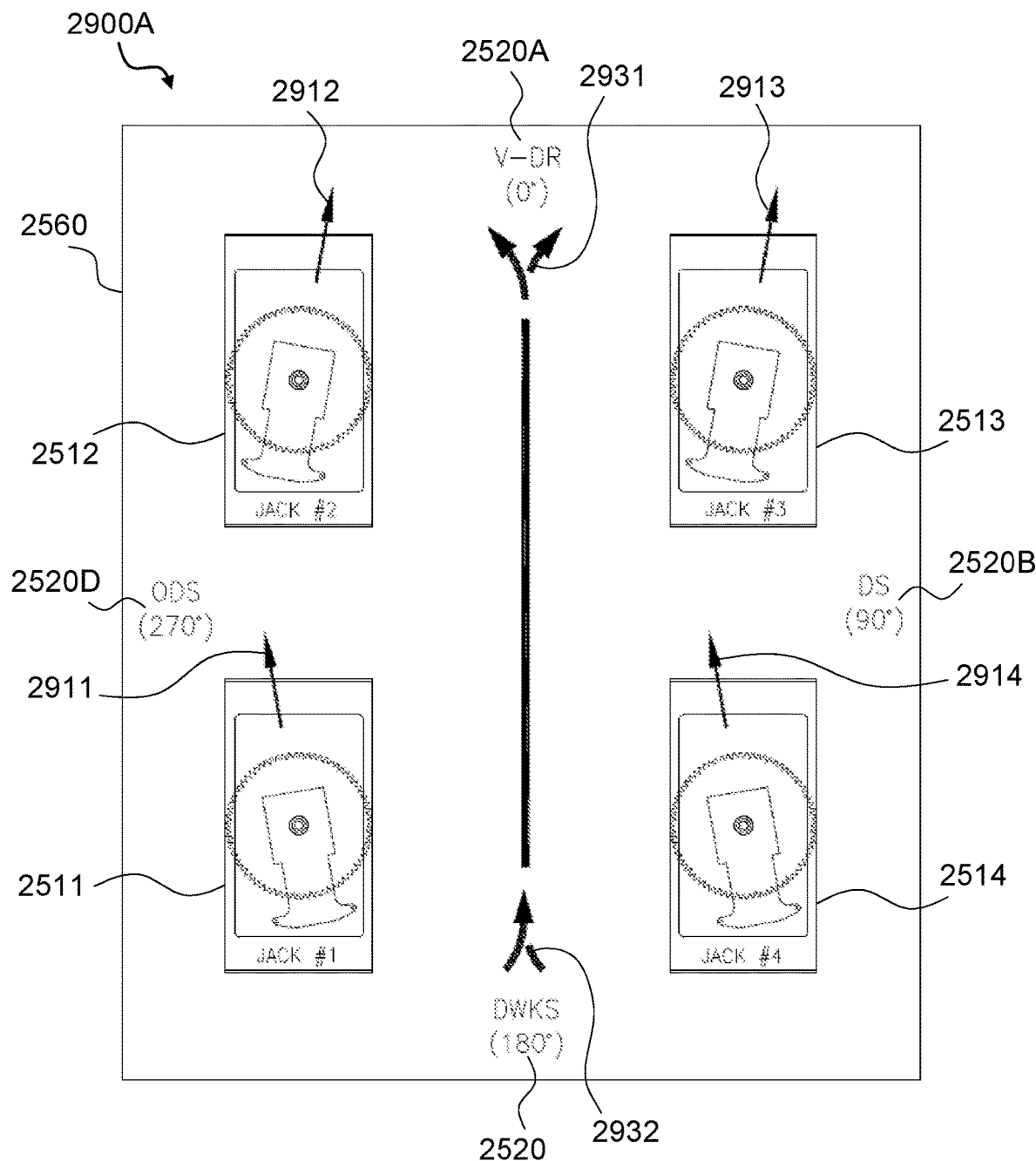
FIG. 29 A-D depicts the normal steering mode schematic diagram of the control panel.

FIG. 29A illustrates a normal steering mode schematic 2900A. The normal steering mode schematic 2900A includes a front angle 2931 and a rear angle 2932. The front angle 2931 is the direction of movement of the 0° orientation location 2520A of the assemblage of walking apparatuses 2511, 2512, 2513, and 2514 and the rear angle 2932 is the direction of movement of the 180° orientation location 2520C of the assemblage of walking apparatuses 2511, 2512, 2513, and 2514.

The normal mode dial position 2730 (FIG. 27) allows the 0° orientation location button 2720A (FIG. 27) on the operator interface 2510 (FIG. 25A) to be used in conjunction with the set point input device 2785 (FIG. 27) to adjust the front angle 2931. The control panel 2590 (FIG. 25A) determines the required second and third walking apparatus orientations 2912 and 2913 that results in the desired front angle 2931 of the assemblage of walking apparatuses 2511, 2512, 2513, and 2514. The normal mode dial position 2730 (FIG. 27) allows the 180° orientation location button 2720C (FIG. 27) on the operator interface 2510 (FIG. 25A) to be used in conjunction with the set point input device 2785 (FIG. 27) to adjust the rear angle 2932. The control panel 2590 (FIG. 25A) determines the required first and fourth walking apparatus orientations 2911 and 2914 that results in the desired rear angle 2932 of the assemblage of walking apparatuses 2511, 2512, 2513, and 2514.

Figure 29B:
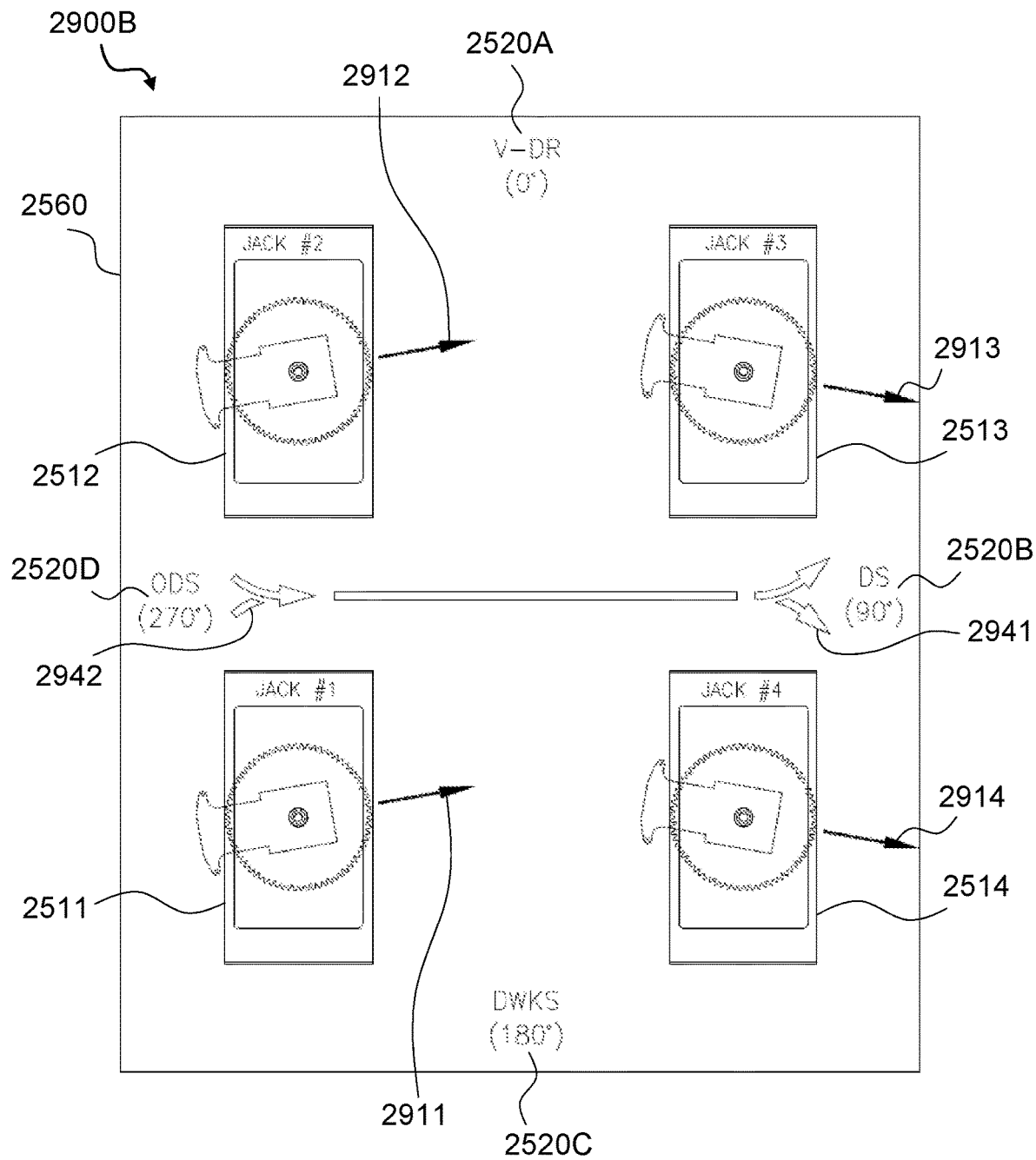

FIG. 29B illustrates a lateral steering mode schematic 2900B. The lateral steering mode schematic 2900B includes a front angle 2941 and a rear angle 2942. The front angle 2941 is the direction of movement of the 90° orientation location 2520B of the assemblage of walking apparatuses 2511, 2512, 2513, and 2514 and the rear angle 2942 is the direction of movement of the 270° orientation location 2520D of the assemblage of walking apparatuses 2511, 2512, 2513, and 2514.

The lateral mode dial position 2740 (FIG. 27) allows the 90° orientation location button 2720B (FIG. 27) on the operator interface 2510 (FIG. 25A) to be used in conjunction with the set point input device 2785 (FIG. 27) to adjust the front angle 2941. The control panel 2590 (FIG. 25A) determines the required third and fourth walking apparatus orientations 2913 and 2914 that results in the desired front angle 2941 of the assemblage of walking apparatuses 2511, 2512, 2513, and 2514. The lateral mode dial position 2740 (FIG. 27) allows the 270° orientation location button 2720D (FIG. 27) on the operator interface 2510 (FIG. 25A) to be used in conjunction with the set point input device 2785 (FIG. 27) to adjust the rear angle 2942. The control panel 2590 (FIG. 25A) determines the required first and second walking apparatus orientations 2911 and 2912 that results in the desired rear angle 2942 of the assemblage of walking apparatuses 2511, 2512, 2513, and 2514.

Figure 29C:
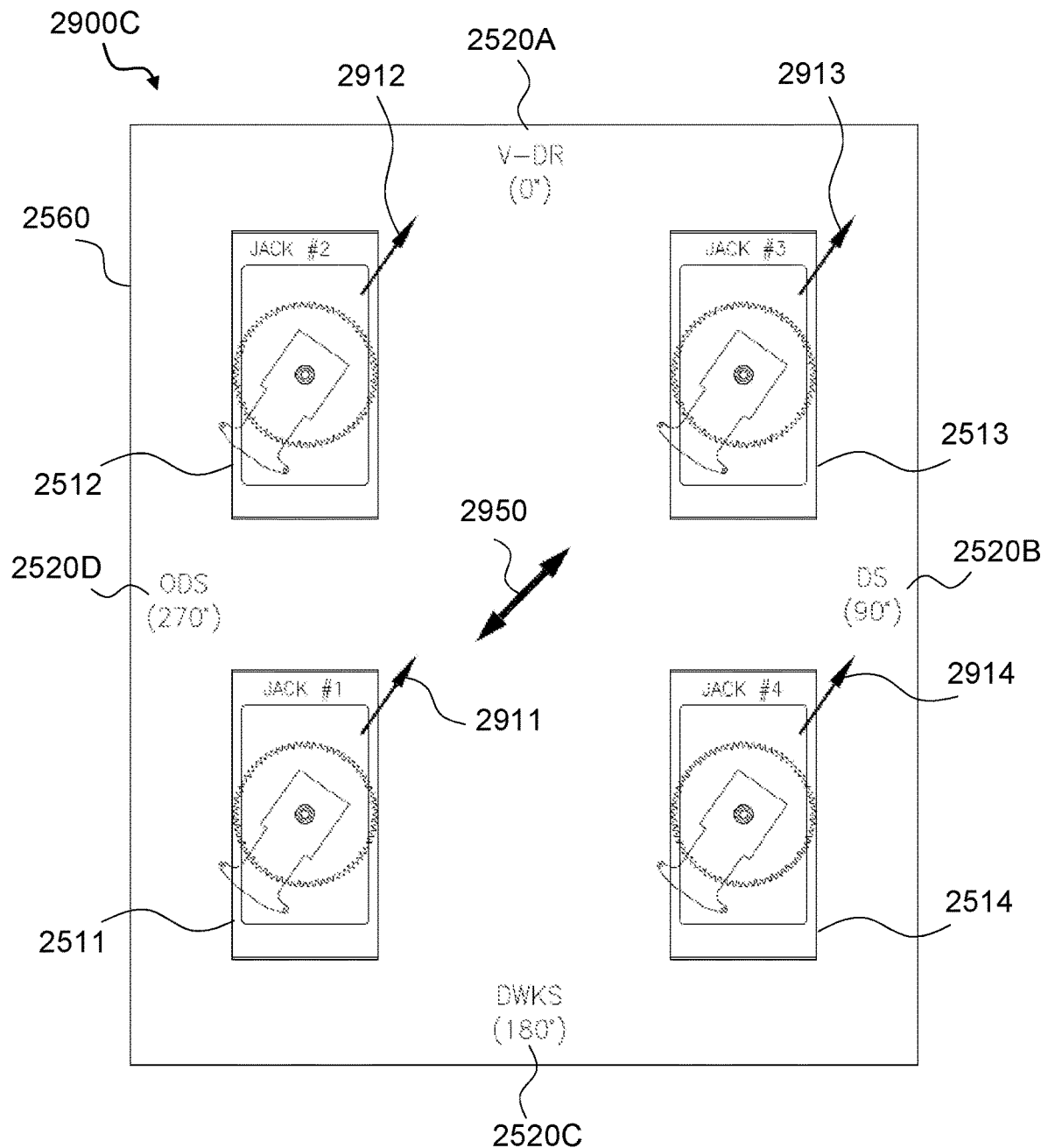

FIG. 29C illustrates a crab steering mode schematic 2900C. The crab steering mode schematic 2900C includes a crab angle 2950. The crab angle 2950 is the direction of movement of the assemblage of walking apparatuses 2511, 2512, 2513, and 2514.

The crab mode dial position 2750 (FIG. 27) allows any of the orientation location buttons 2720A-D (FIG. 27) on the operator interface 2510 (FIG. 25A) to be used in conjunction with the set point input device 2785 (FIG. 27) to adjust the crab angle 2950. The control panel 2590 (FIG. 25A) uses the crab angle 2950 as the angle for all of the walking apparatus orientations 2911, 2912, 2913, and 2914.

Figure 29D:
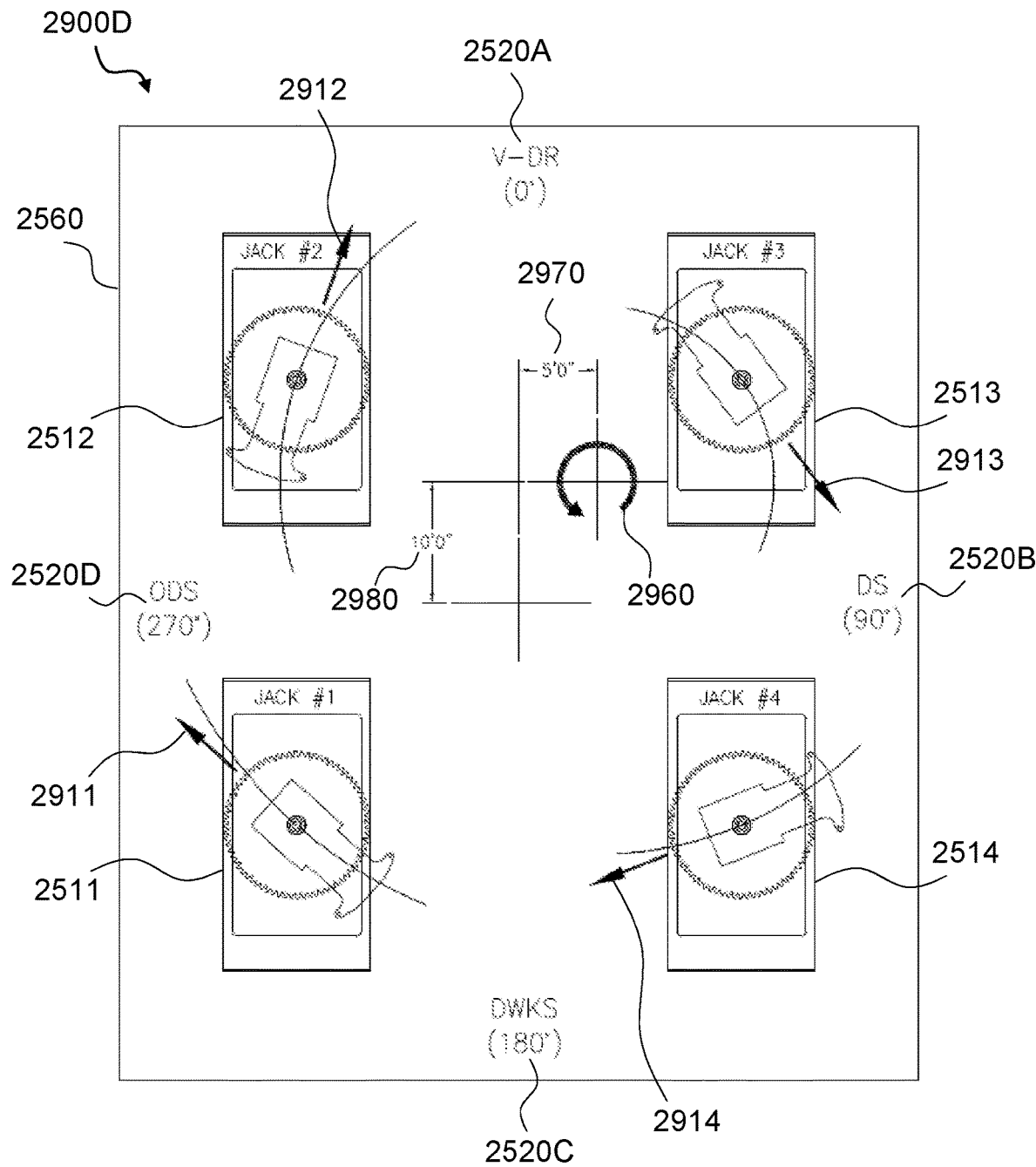

FIG. 29D illustrates a spin steering mode schematic 2900D. The spin steering mode schematic 2900D includes a spin center X location 2970 and a spin center Y location 2980. The spin center locations 2970 and 2980 illustrate the distance between the geometric center of the assemblage of walking apparatuses 2511, 2512, 2513, and 2514 and a spin center 2960.

The spin mode dial position 2760 (FIG. 27) allows the orientation location buttons 2720A-D (FIG. 27) on the operator interface 2510 (FIG. 25A) to be used to move the spin center 2960 in the direction of the orientation locations 2520A-D (FIG. 25A) respectively within the assemblage of walking apparatuses 2511, 2512, 2513, and 2514. The control panel 2590 (FIG. 25A) uses the spin center X location 2970 and the spin center Y location 2980 to determine the required walking apparatus orientations 2911, 2912, 2913, and 2914 which will substantially rotate the assemblage of walking apparatuses 2511, 2512, 2513, and 2514 around the spin center 2960.

Figure 30A:
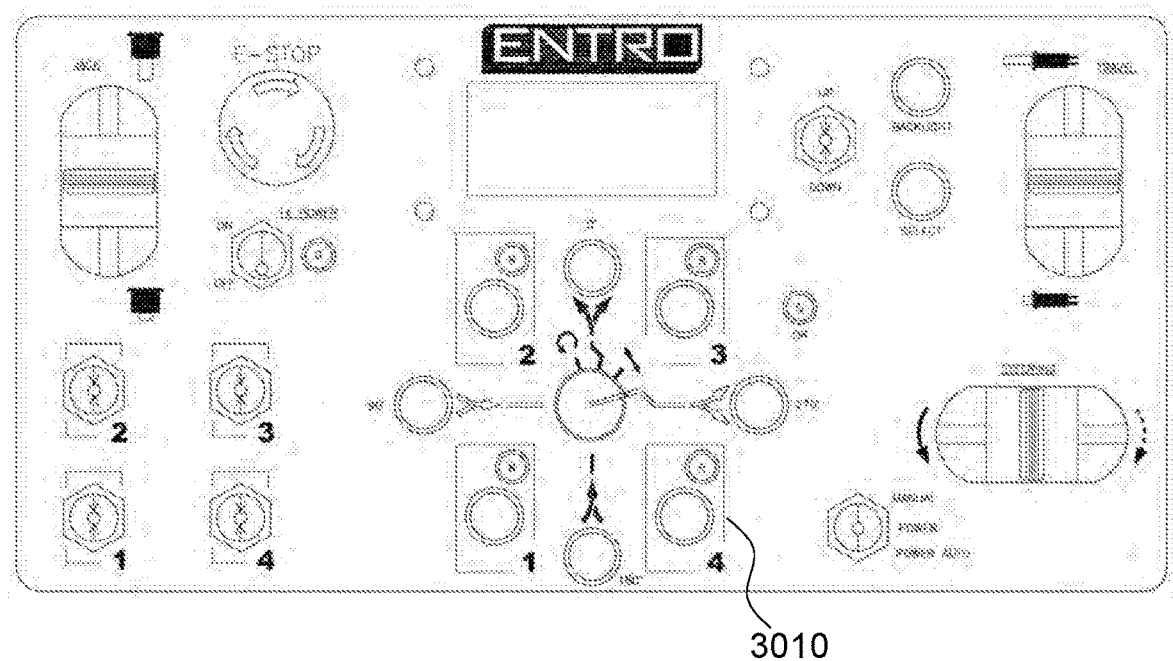
FIG. 30 A-B depicts the graphical representation of the assemblage of walking apparatus.
Figure 30B:
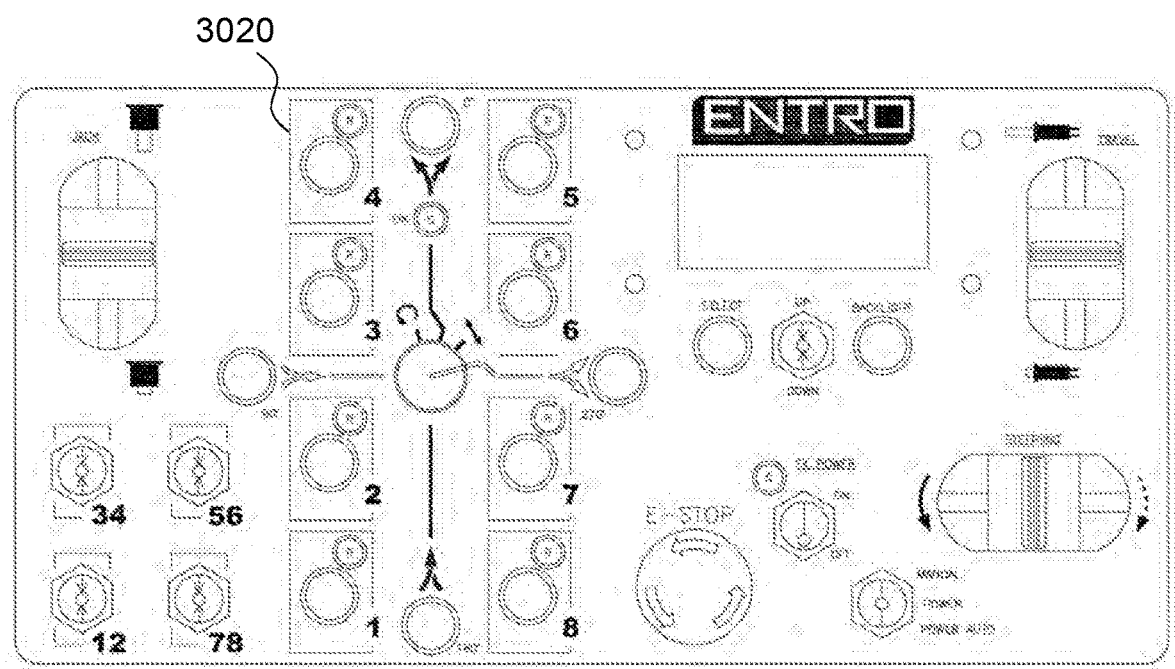

FIGS. 30A and 30B illustrate various embodiments of the graphical representation of the assemblage of walking apparatuses. FIG. 30B depicts one embodiment which consists of eight walking apparatuses 3020, while FIG. 30A illustrates an embodiment with the graphical representation of four walking apparatuses 3010 in a different arrangement on the operational interface 2510 (FIG. 25A).

Figure 31:
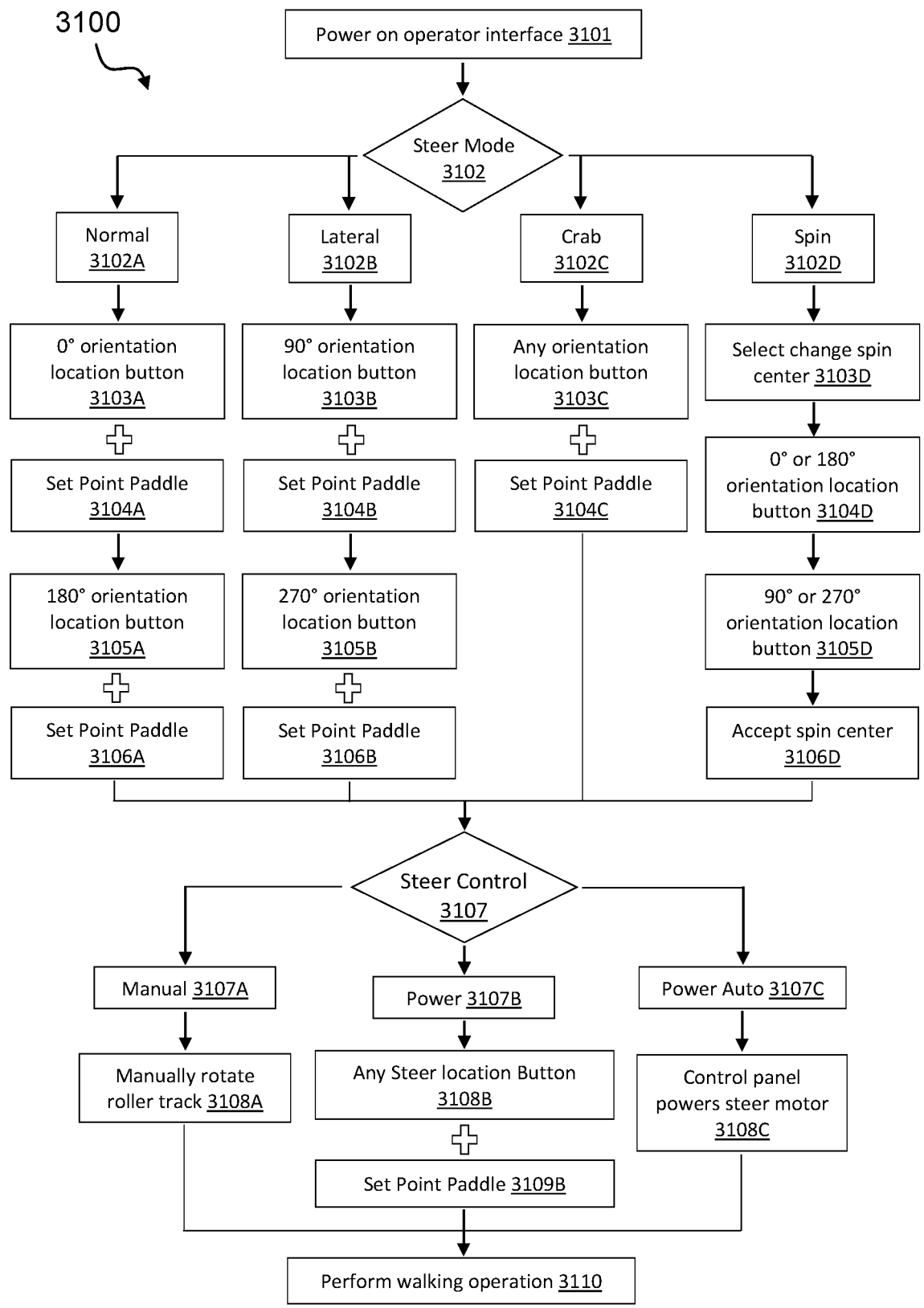
FIG. 31 depicts the schematic diagram of the control panel.

FIG. 31 depicts an operational flowchart 3100 for operating the control panel 2590 (FIG. 25A) and controlling the assemblage of walking apparatuses 2511, 2512, 2513, and 2514. The operational flowchart 3100 includes a first step 3101 consisting of turning on the power toggle 2633. A second step 3102 consists of selecting the steer mode dial 2780 to one of the four steer mode options; Normal 3102A, Lateral 3102B, Crab 3102C, or Spin 3102D.

In Normal 3102A, a third step 3103A consists of holding down the 0° orientation location button 2720A (FIG. 27) followed by a fourth step 3104A of using the set point input paddle 2782 (FIG. 27) to adjust the front angle 2931 (FIG. 29A). A fifth step 3105A includes holding down the 180° orientation location button 2720C (FIG. 27) followed by a sixth step 3106A of using the set point input paddle 2782 (FIG. 27) to adjust the rear angle 2932 (FIG. 29A).

In Lateral 3102B, a third step 3103B consists of holding down the 90° orientation location button 2720B (FIG. 27) followed by a fourth step 3104B of using the set point input paddle 2782 (FIG. 27) to adjust the front angle 2941 (FIG. 29A). A fifth step 3105B includes holding down the 270° orientation location button 2720D (FIG. 27) followed by a sixth step 3106B of using the set point input paddle 2782 (FIG. 27) to adjust the rear angle 2942 (FIG. 29A). In Crab 3102C, a third step 3103C consists of holding down any one of the orientation location buttons 2720A-B (FIG. 27) followed by a fourth step 3104B of using the set point input paddle 2782 (FIG. 27) to adjust the crab angle 2950 (FIG. 29A).

In Spin 3102D, a third step 3103D includes pressing the select button 2631 (FIG. 26) to select the option to change the spin center 2960 (FIG. 29D). A fourth step 3104D consists of pressing down the 0° or 180° orientation location buttons 2720A or 2720C (FIG. 27) to move the spin center 2960 (FIG. 29D) toward the 0° or 180° orientation location 2520A or 2520C (FIG. 25A) respectively. A fifth step 3105D consists of pressing down the 90° or 270° orientation location buttons 2720B or 2720D (FIG. 27) to move the spin center spin center 2960 (FIG. 29D) toward the 90° or 270° orientation location 2520B or 2520D (FIG. 25A) respectively. A sixth step 3016D includes accepting the new spin center by pressing the select button 2631 (FIG. 26).

Adjusting steering is followed by a seventh step 3107 to select the steer control by positioning the steer control toggle 2784 (FIG. 27). The steer control toggle 2784 has three options; manual 3107A, power 3107B, or power auto 3107C. In manual 3107A, steering control is performed by an eighth step 3108A which includes physically rotating the roller track 2514H (FIG. 25B). In power 3107B, steering control is performed by an eighth step 3108B of by pressing down one of the steer location buttons 2711, 2712, 2713, or 2714 (FIG. 27) to inform the control panel 2590 (FIG. 25A) which of the walking apparatuses 2511, 2512, 2513, and 2514 (FIG. 25A) to steer. The eighth step 3108B is followed by a ninth step 3109B which consists of using the set point input paddle 2782 (FIG. 27) to adjust the walking apparatus orientation 2911, 2912, 2913, or 2914 (FIG. 29). In power auto 3107C, steering control is performed by an eighth step 3108C of the control panel 2590 (FIG. 25A) automatically adjusting the walking apparatus orientations 2911, 2912, 2913, or 2914 (FIG. 29).

The final step 3110 involves running the walker through a basic walking cycle. The steering and walking operations are repeated as necessary to move the load to the desired location.

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

We claim:

1. An apparatus for moving a load, comprising:
 a plurality of lift mechanisms configured to lift a load substantially vertical away from a surface;
 a plurality of support feet proximally mounted to said lift mechanisms to bear said load on said surface;
 a plurality of travel cylinders configured to move said support feet substantially horizontally relative to said lift mechanisms;
 a plurality of orientation devices for controlling an orientation of said travel cylinders relative to said apparatus;
 an operator interface with a graphical representation of said apparatus;
 one or more set point input devices to adjust set points for the orientation of said travel cylinders; and
 a plurality of steer location buttons that control the plurality of travel cylinders placed on a location of said graphical representation that corresponds to a location relative to the plurality of travel cylinders on said apparatus, whereby selection of steer location buttons coupled with a selection of said set point input devices results in adjustment of the orientation of said travel cylinders in a relative proximity of said steer location buttons.

2. The apparatus of claim 1 further comprising roller assemblies pivotally coupled to said lift mechanisms.

3. The apparatus of claim 2 further comprising a roller track connected to said roller assemblies configured to allow said roller assemblies to move over the roller track in a first direction and connected to a movement device, wherein said travel cylinders are structured to displace said roller assemblies relative to said roller track along said first direction.

4. The apparatus of claim 3 further comprising a pin connector connecting one or more of said support feet with said roller track, said pin connector structured to allow said roller track to rotate relative to the one or more of said support feet.

5. The apparatus of claim 1 wherein the plurality of orientation devices for controlling an orientation further comprising a steering motor configured to orient a direction of said travel cylinders.

6. The apparatus of claim 5 wherein said steering motor further includes a feedback sensor coupled to sense the orientation of said steering motor.

7. The apparatus of claim 6 further comprising a control panel electrically coupled to said feedback sensor to process signals from said feedback sensor and inputs from said operator interface.

8. The apparatus of claim 1 wherein said operator interface further includes a graphical representation of the load.

9. A load moving apparatus, comprising:
 an assemblage of one or more walking devices further comprising;
  lift mechanisms, said lift mechanisms operably configured to lift a load vertically away from a surface;
  walking apparatuses, said walking apparatuses operably configured to move said load horizontally relative to said surface;
  orientation devices, said orientation devices operably configured for orientation of said load relative to said surface;
 an operator interface for controlling said assemblage of one or more walking devices;
 a display operably coupled to said operator interface, said display displaying;
  a graphical representation of said assemblage of one or more walking devices;
  one or more location selection devices representing a location of said one or more walking devices;
  one or more steer location buttons for adjusting said orientation of said one or more walking devices placed on a location of said graphical representation of said assemblage of one or more walking devices that corresponds to a location relative to said one or more walking devices;
 a control console operably coupled to
  said operator interface and said assemblage of one or more walking devices, said control console further comprising;
   at least one of: electrical cables, interfaces on a radio frequency spectrum, a packet switched wireless connection, or a packet switched optical connection either in an infrared or a visible spectrum to send and receive operator interface signals from said operator interface;
   one or more position sensors from said one or more walking devices that are electronically controlled via the control console; and
   one or more hydraulic valves controlling hydraulic cylinders coupled to said one or more walking devices that are electronically controlled via the control console.

10. The apparatus as described in claim 9, wherein said operator interface further comprises a steering control toggle that is configured to select at least one of a manual steering position or an automatic steering position.

11. The apparatus as described in claim 9, wherein said walking devices send signals from the one or more position sensors through a steer position sensor mechanically coupled to a steer motor mechanically coupled with a gear teeth on a roller track.

12. The apparatus as described in claim 10, further comprising a steering motor that includes a feedback sensor coupled to the steering motor to sense said orientation of said one or more walking devices.

13. The apparatus as described in claim 12, further comprising a control panel means that is electrically coupled to said feedback sensor to process signals from said operator interface and said feedback sensor.

14. The apparatus as described in claim 9, further comprising;
 a lift valve that is controlled by the control console via a lift valve control signal by extending and retracting a lift cylinder that is configured to raise and lower said load relative to said surface;
 a travel valve that is controlled by the control console via travel valve control signal by extending and retracting a travel cylinder that is configured to move said load horizontally relative to said surface; and
 a steer valve that is controlled by the control console via steer valve control signal by rotating a steer motor in clockwise and anticlockwise direction.

15. The apparatus as described in claim 9, wherein said graphical representation of said assemblage of said one or more walking devices further comprising: one or more buttons, one or more paddles, one or more toggles, one or more rotary dials; one or more display symbols; and one or more forms of control inputs.

16. The apparatus as described in claim 9, wherein said operator interface includes an area of lift controls for operating one or more lift cylinders coupled to one or more walking devices.

17. The apparatus as described in claim 9, wherein said operator interface includes an area of travel controls for operating one or more travel cylinders coupled to said assemblage of one or more walking devices.

18. The apparatus as described in claim 9, wherein said operator interface includes an area of steering location controls for operating one or more steer motors coupled to said assemblage of one or more walking devices.

19. A method of steering a load transporting device connected to a load-bearing frame supporting a load; the load transporting device including an assemblage of walking devices operably coupled to an operator interface via a control console, the method comprising;
  lifting a load vertically away from a surface by a lift mechanism;
  moving the load horizontally relative to said surface by a load transporting device;
  orienting the load relative to said surface by an orientation device;
  activating said lift mechanism to raise said load-bearing frame relative to said surface;
  displaying one or more orientation location buttons on a graphical representation of the assemblage of walking devices at a position on the graphical representation that is relative to a location of the assemblage of walking devices;
  activating the one or more orientation location buttons while activating one or more steer location buttons to select a location on said assemblage of walking devices and to adjust an angle;
  automatically calculating the angles for each walking device;
  automatically adjusting the orientation of each walking device relative to said load-bearing frame;
  activating said lift mechanism to lower said load-bearing frame to said surface and raising said load supported by said load-bearing frame; and
  activating said load transporting apparatus to transport said load relative to said surface.

20. The method as described in claim 19, wherein said orientation device to orient said load relative to said surface is in a normal, lateral, crab or spin steering mode.

\* \* \* \* \*